US010033703B1

(12) United States Patent
Sharifi Mehr

(10) Patent No.: US 10,033,703 B1
(45) Date of Patent: Jul. 24, 2018

(54) PLUGGABLE CIPHER SUITE NEGOTIATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 14/741,387

(22) Filed: Jun. 16, 2015

(51) Int. Cl.
*H04L 29/06* (2006.01)
*H04L 9/32* (2006.01)
*G06F 8/60* (2018.01)

(52) U.S. Cl.
CPC ............ *H04L 63/0428* (2013.01); *G06F 8/60* (2013.01); *H04L 9/3247* (2013.01); *H04L 63/126* (2013.01)

(58) Field of Classification Search
None
See application file for complete search history.

(56) References Cited

U.S. PATENT DOCUMENTS

| 6,263,435 | B1 | 7/2001 | Dondeti et al. | |
|---|---|---|---|---|
| 6,944,762 | B1 | 9/2005 | Garrison | |
| 7,219,223 | B1 * | 5/2007 | Bacchus | H04L 63/0428 713/150 |
| 8,296,826 | B1 | 10/2012 | Bartolucci et al. | |
| 8,819,116 | B1 * | 8/2014 | Tomay | H04N 21/254 709/203 |
| 2003/0147536 | A1 | 8/2003 | Andivahis et al. | |
| 2007/0180130 | A1 * | 8/2007 | Arnold | H04L 69/18 709/230 |
| 2008/0066184 | A1 | 3/2008 | Ben-Ami et al. | |
| 2009/0106550 | A1 | 4/2009 | Mohamed | |
| 2009/0313471 | A1 * | 12/2009 | Bjorkengren | G06F 21/10 713/170 |
| 2010/0058016 | A1 * | 3/2010 | Nikara | G06F 12/1027 711/163 |
| 2011/0296167 | A1 * | 12/2011 | Adusumilli | H04L 63/04 713/152 |

(Continued)

FOREIGN PATENT DOCUMENTS

WO    2008024135 A2    2/2008

OTHER PUBLICATIONS

Dierks, T., et al., "The TLS Protocol Version 1.0," Request for Comments: 2246, Standards Track, Jan. 1999, 75 pages.

(Continued)

*Primary Examiner* — Michael R Vaughan
(74) *Attorney, Agent, or Firm* — Davis Wright Tremaine LLP

(57) ABSTRACT

The present document describes systems and methods that provide pluggable cipher suites. In one embodiment, a client and a server perform a secure transport handshake that negotiates a set of supported cipher suites. The server determines if the cipher suites supported by the client are acceptable. When the server determines that the cipher suites supported by the client are not acceptable, the server provides a pluggable cipher suite to the client. The client runs the pluggable cipher suite in a sandboxed environment, and uses the pluggable cipher suite to add support for one or more additional cipher suites. In some implementations, the pluggable cipher suite is provided by a third-party server.

20 Claims, 19 Drawing Sheets

(56) References Cited

U.S. PATENT DOCUMENTS

| | | | | |
|---|---|---|---|---|
| 2012/0117377 | A1* | 5/2012 | Patil | H04L 63/166 713/153 |
| 2013/0125247 | A1 | 5/2013 | Sprague et al. | |
| 2013/0283039 | A1 | 10/2013 | Jevans | |
| 2014/0007048 | A1* | 1/2014 | Qureshi | G06F 21/10 717/110 |
| 2014/0075184 | A1 | 3/2014 | Gorbach et al. | |
| 2015/0341317 | A1* | 11/2015 | Zombik | H04L 63/0245 713/151 |
| 2015/0365232 | A1 | 12/2015 | Yang et al. | |
| 2016/0226827 | A1* | 8/2016 | Bohannon | H04L 63/0281 |
| 2016/0315918 | A1 | 10/2016 | Pollet et al. | |

OTHER PUBLICATIONS

Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, E., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.

* cited by examiner

PLUGGABLE CIPHER SUITE NEGOTIATION

BACKGROUND

Data security is an important aspect of most computer systems. In many systems, data security is provided, at least in part, by data encryption. Data encryption schemes have evolved over time to provide increasing amounts of security and performance. In some encryption schemes, an encrypted message is arranged in an envelope structure. For example, in one encryption scheme, an envelope includes a randomly-generated cryptographic key, and a data portion that is encrypted with the cryptographic key. The cryptographic key is encrypted using a shared key encrypting key ("KEK") known by both the sender and the recipient. When the recipient receives the message, the recipient uses the shared KEK to decrypt the cryptographic key in the envelope, and uses the decrypted cryptographic key to decrypt the data portion of the message. Provided that the KEK is not compromised, the value of the KEK can be rotated by re-encrypting the cryptographic key in each envelope. If the KEK is compromised, an attacker that gains access to an envelope can decode the cryptographic key in the envelope and decrypt the encrypted data.

In a client-server system, data encryption can be performed client-side or server-side. For example, in a data storage service, a storage server provides server-side encryption by encrypting plaintext data received from clients and retaining the data in encrypted form. When a client requests data from the server, the encrypted data is decrypted by the server before the data is returned to the client. When client-side encryption is used, the client encrypts data before sending the data to the storage server. The storage server receives and stores the encrypted data, and when requested, returns the data to the client in encrypted form. In some situations, server-side encryption does not protect the stored data against an unauthorized client using stolen access credentials. However, server-side encryption can sometimes provide higher cryptography performance (i.e., using custom cryptography chipsets).

Since cryptographic protocols are often updated in response to new security threats and advances in cryptographic technology, it can be difficult to maintain up-to-date cryptographic software on client computers. Some cryptographic network protocols (such as transport layer security ("TLS")) are designed to allow a variety of different systems running in different environments to securely communicate over untrusted networks. In some implementations, these protocols provide improved flexibility and interoperability by using a handshake process. The handshake process negotiates the configuration of a specific connection between two endpoints (i.e., client and server). In the case of TLS, part of the negotiated configuration is a cipher suite which will be used for key exchange and data record encryption. In some systems, when a client connects to a server, but the server determines that none of the client's cipher suites are supported by the server, the server will reject the connection from the client. Such situations may occur where a client has not received security patches or has been misconfigured.

BRIEF DESCRIPTION OF THE DRAWINGS

Various embodiments in accordance with the present disclosure will be described with reference to the drawings, in which.

DETAILED DESCRIPTION

Figure 1:
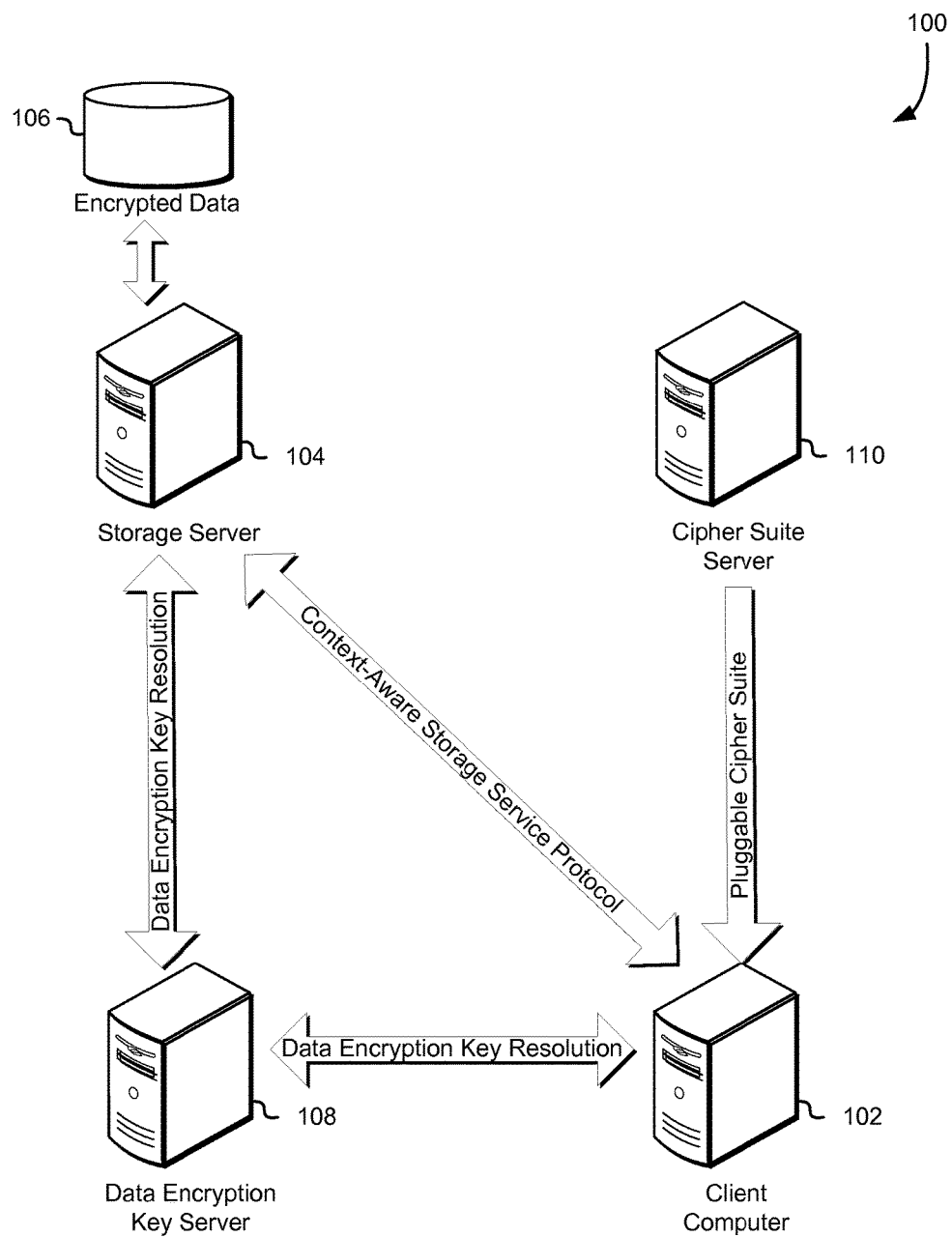
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods that secure sensitive data by encrypting the data with an envelope-based encryption scheme. An envelope includes a data encryption key reference ("DEKR") and data that has been encrypted with a data encryption key ("DEK"). A data encryption key server maintains a collection of data encryption keys. Each DEK is accessible using an associated data encryption key reference ("DEKR"). In various implementations, a DEKR is a reference address, a token, an index to key management system, a uniform resource locator ("URL"), a uniform resource name ("URN"), or a uniform resource identifier ("URI") to a DEK which is stored in an online key server. URLs and URNs are types of URIs. In various implementations. A DEKR may expire after an amount of time, or after a number of resolution operations. To decrypt the data included in an envelope, a recipient resolves the DEKR to obtain the DEK, decrypts the DEK using a key encrypting key ("KEK"), and then decrypts the encrypted data using the decrypted DEK. In some implementations, the DEKR is encrypted with the KEK. In various implementations, the KEK can be a shared secret cryptographic key known to both the sender and the recipient. In other implementations, the KEK is a public cryptographic key of a public-private key pair. Since, in some embodiments, the DEK is not directly stored in the envelope, when the contents of a particular envelope are compromised, data owners can update the data encryption key server's configuration to stop resolving the compromised DEKRs to DEKs. When a KEK is compromised, in some implementations, audit logs on the data encryption key server can be used to identify particular DEKRs that were resolved by an attacker. Once the particular DEKRs are identified, the associated DEKs can be updated, and the associated data can be re-encrypted.

The envelope-based encryption scheme has applications beyond merely transmitting messages from a sender to a recipient. For example, in a data storage service, data can be stored on a remote storage server as a collection of records, each record including a DEKR and data encrypted with a DEK (i.e., an envelope). In various implementations, the encrypting and decrypting operations can be performed by a client or by the server.

In certain implementations where the encryption and decryption of data is performed by the storage server (server-side encryption), the client exchanges plaintext data with the storage server. When the storage server receives data from the client, the storage server encrypts the data with a DEK, and then stores the DEK on a data encryption key server, receiving a DEKR in exchange. The storage server retains the DEKR and the encrypted data in a data record or envelope. When the data is requested by a client, the server opens the data record and extracts the DEKR and the encrypted data. The server contacts the data encryption key server to resolve the DEKR to a DEK, and decrypts the encrypted data using the DEK. The plaintext data is returned to the client.

In certain implementations where the encryption and decryption of data is performed by the client (client-side encryption), the client exchanges encrypted data with the storage server. Before sending data to the storage server, the client encrypts the data with a DEK, and sends the DEK to a data encryption key server, receiving a DEKR in response. The client sends the encrypted data and the DEKR to the storage server. The storage server stores the data records without decrypting or further encrypting the information in the record. When the client requests the data record, the data record is returned to the client without decrypting the data, and the decrypting operations are performed by the client. In some implementations, the storage server is unable to decrypt the data and/or resolve the DEKR to a DEK.

In certain embodiments, the encrypting and/or decrypting operations associated with a particular request can be performed by either the client or the storage server. In one implementation, the storage server determines a trust score associated with a received request. The trust score can be based at least in part on a combination of: policy permissions granted to the client; the origin of the request; the time of the request; and freshness of the client's access credentials. If the trust score is less than a threshold value, the server will satisfy the request by providing encrypted data, and the client will perform the decrypting operations. If the trust score is not less than a threshold value, the server will perform the decrypting operations, and satisfy the request by providing plaintext data to the client. In these embodiments, both the client and the storage server are able to encrypt and decrypt the data records. This can be accomplished by providing both the client and the storage server access to the data encryption key server and access to the KEK. In some implementations, the client decrypts the data using an on-premise secure key management system.

In various embodiments, deployment of these encryption protocols is facilitated by the use of pluggable cipher suites that are negotiated as part of a secure transport protocol. For example, in some implementations, when no acceptable cipher suite is identified during a TLS handshake, the client is provided with a pluggable cipher suite that is compatible with a cipher suite supported by the storage server. In TLS, a cipher suite is often a named set of encryption and encryption-related algorithms that can be used to secure a network connection using the TLS/SSL protocol. In other implementations, a cipher suite may refer to a defined set of encryption algorithms, encryption standards, authentication codes or key exchange algorithms. The pluggable cipher suite can be provided by the storage server itself, or by a cipher suite server. Pluggable cipher suites are executable code that is configured to be added to an existing secure protocol implementation. For example, a computer system that includes an implementation of the TLS protocol, can use pluggable cipher suites to add additional cipher suite support to the computer system. Pluggable cipher suites can be installed at run time, after the secure protocol has been compiled, installed and executed on the host system. In some implementations, the pluggable cipher suite runs in a sandboxed environment on the client. Pluggable cipher suites can be digitally signed by the storage server or by another trusted provider of cipher suites. The particular pluggable cipher suite provided to a client can be based at least in part on capabilities that the client has negotiated during the handshake. For example, during the handshake the client may specify that it can run pluggable cipher suites which are in JavaScript with maximum size of 800 KB. This will assist the server in responding with a link to a compatible pluggable cipher suite. In some embodiments, pluggable cipher suites installed on a particular client are saved and assigned a unique identifier or fingerprint that allows the client to identify when a particular pluggable cipher suite has already been installed. When a particular pluggable cipher suite has already been installed, and a server responds with a link to the already installed pluggable cipher suite, the retrieval and installation process may be omitted.

FIG. 1 shows an illustrative example of an environment in which various embodiments may be practiced. Diagram 100 shows a system that provides data storage services to a client computer 102. A storage server 104 maintains a store of encrypted data 106. In some implementations, the encrypted data 106 is stored as a set of envelope-encrypted records where each envelope-encrypted record includes a DEKR and data encrypted with a corresponding DEK. The client computer 102 communicates with the storage server 104 using a context-aware storage service protocol. The context-aware storage service protocol supports client-side encryption and server-side encryption. When server-side encryption is used, data is exchanged between the client computer 102 and the storage server 104 in plaintext format. When client-side encryption is used, data is exchanged between the client computer 102 and the storage server 104 in encrypted form. In some implementations, when data is exchanged between the client computer 102 and the storage server 104 in encrypted form, an envelope-based encryption scheme is used. Whether client-side encryption or server-side encryption is used depends, in some implementations, upon a trust score determined by the storage server 104. The trust score can be determined using characteristics of the client computer 102 and/or characteristics of a particular request made by the client computer 102. In some implementations, regardless of the trust score, the client computer 102 may request that the storage server 104 provide encrypted data. For example, when the client computer 102 intends to transfer the received data to a third party client or service, the client computer 102 may request that the storage server 104 provide encrypted data to the client computer 102.

In various embodiments, a data encryption key server 108 maintains a store of data encryption keys ("DEKs"), and provides corresponding data encryption key references ("DEKRs"). In certain situations, the data encryption key server 108 receives a DEK from the client computer 102 or the storage server 104 and returns a corresponding DEKR. In other situations, the data encryption key server 108 receives a DEKR from the client computer 102 or the storage server 104 and returns the corresponding DEK. In various implementations, the data encryption key server 108 maintains usage or access logs that permit recovery from situations where various cryptographic keys are leaked or client credentials are compromised.

In certain embodiments, the client computer 102 and the storage server 104 attempt to negotiate a mutually supported cipher suite as part of a secure transport handshake. When there is no mutually supported cipher suite installed on the client computer 102, the client computer communicates a set of capabilities for executing a pluggable cipher suite. In some implementations, the storage server 104 identifies a compatible pluggable cipher suite, and provides the compatible pluggable cipher suite to the client computer 102. In another implementation, the storage server 104 provides a reference to a cipher suite server 110 that provides the compatible pluggable cipher suite. The compatible pluggable cipher suite is executed on the client computer 102 in an isolated sandbox environment such as a Java virtual machine, a virtual machine, a JavaScript engine, or other sandboxed scripting environment.

Figure 2:
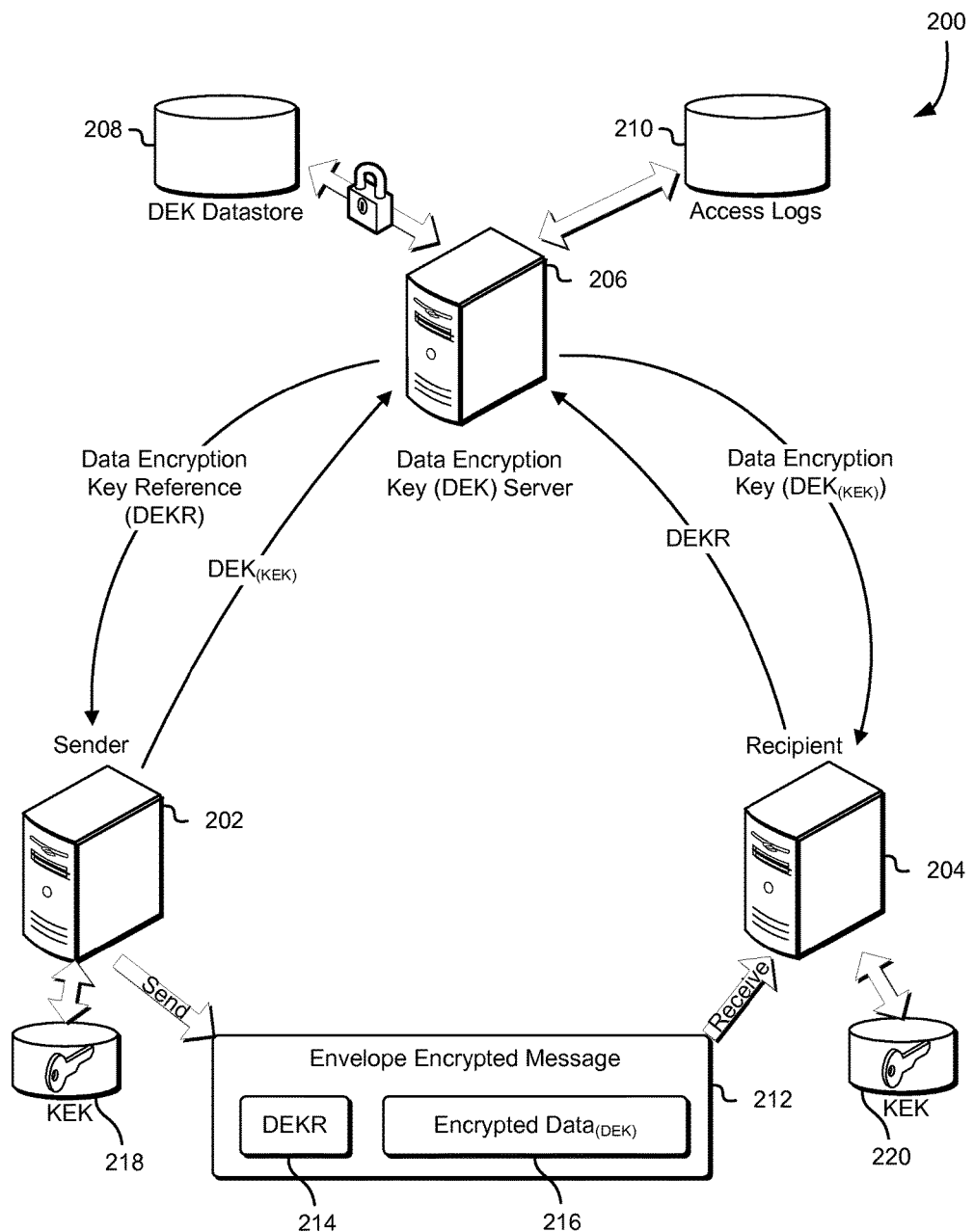
FIG. 2 shows an illustrative example of a system that transmits a message from a sender to a recipient using an envelope-based encryption scheme, in accordance with an embodiment.
Figure 3:
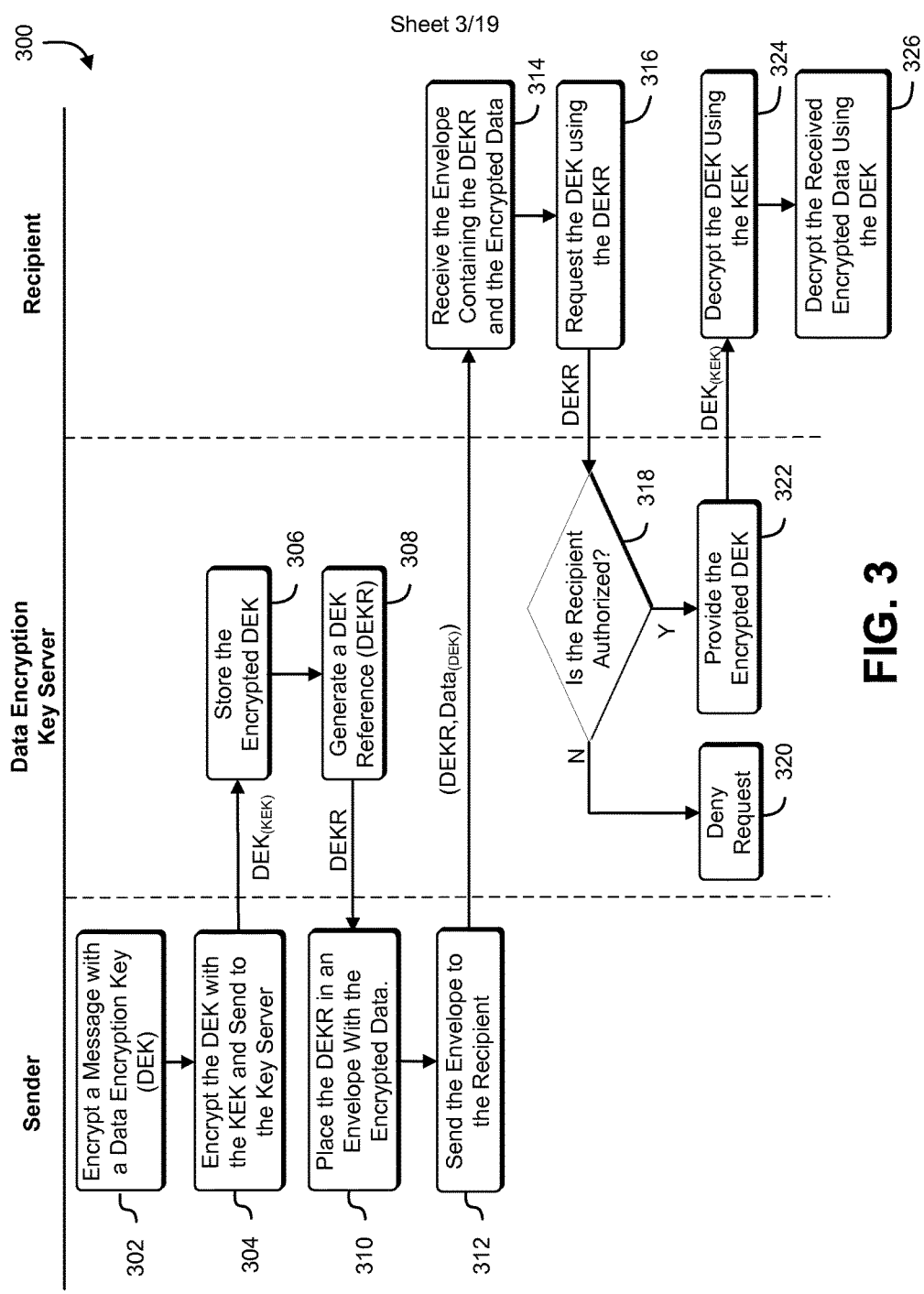
FIG. 3 shows a process that, when performed, transmits an encrypted message from a sender to a recipient using envelope encryption, in accordance with an embodiment.
Figure 4:
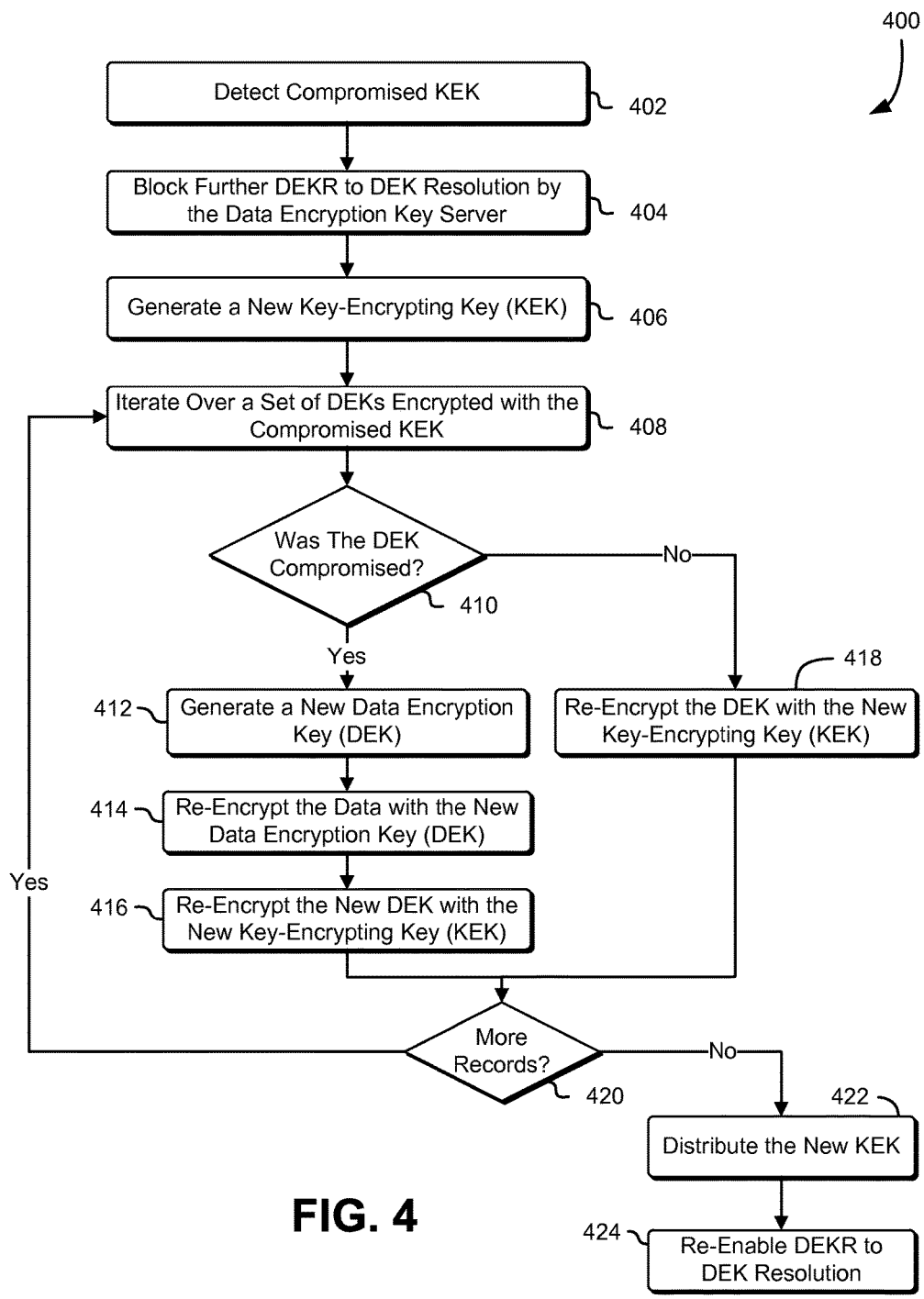
FIG. 4 shows a process that, when performed by a data encryption key server, updates compromised encryption keys, in accordance with an embodiment.
Figure 13:
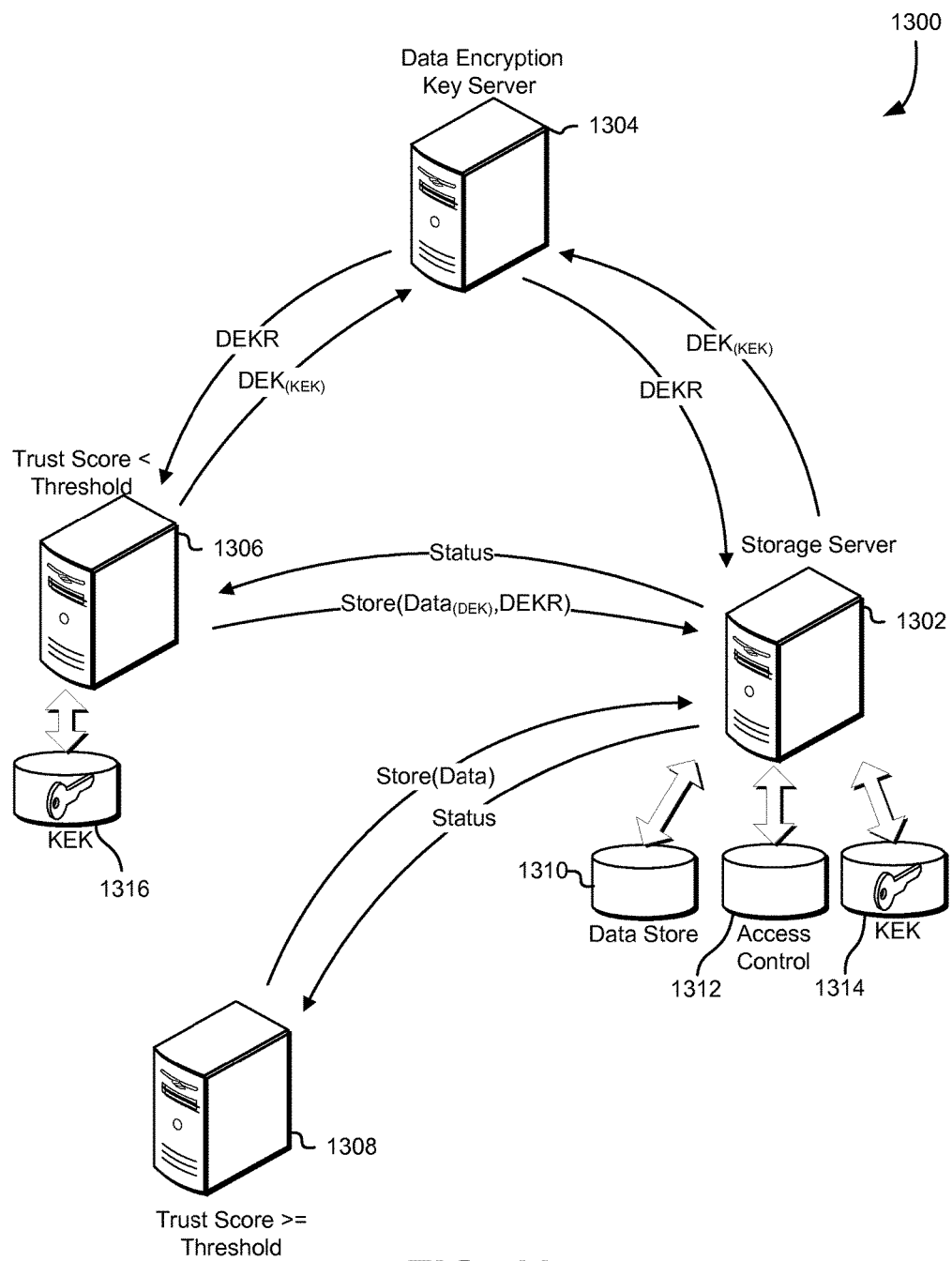
FIG. 13 shows an illustrative example of a storage service that uses server-side or client-side encryption based at least in part on a trust score, in accordance with an embodiment.
Figure 14:
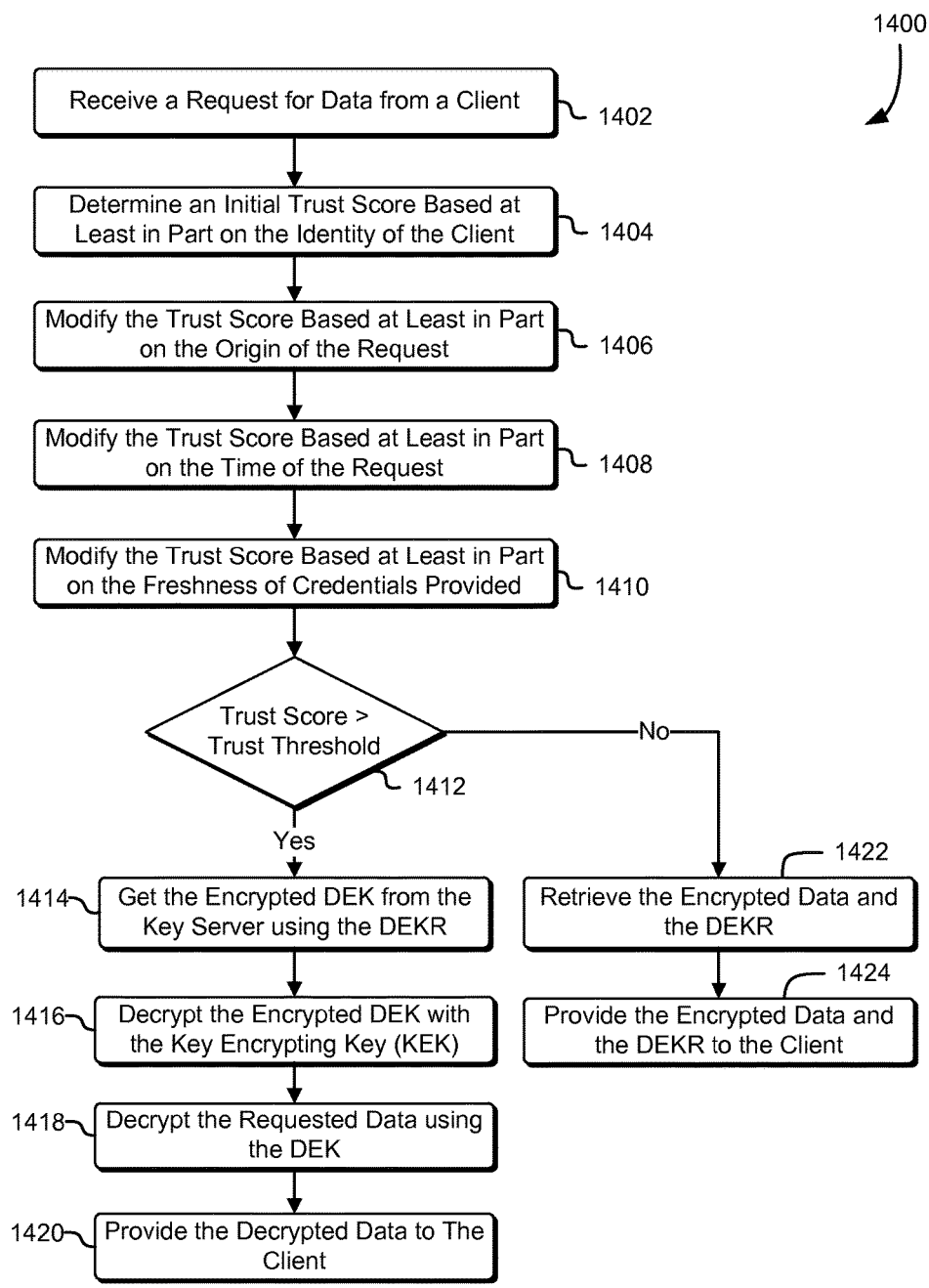
FIG. 14 shows a process that, when performed by a server, determines whether client-side or server-side encryption will be used to fulfill a request, in accordance with an embodiment.

Details of the envelope-based encryption scheme, context-aware storage service protocol, and pluggable cipher suite negotiation are provided in the specification below and in the remaining figures as follows: FIGS. 2-4 illustrate additional detail associated with the envelope-based encryption scheme; FIGS. 5-8 illustrate a storage service that utilizes a client-side envelope-based encryption scheme; FIGS. 9-12 illustrate the storage service utilizing server-side envelope-based encryption scheme; FIGS. 13-14 illustrate the use of a trust score to select between client-side and server-side encryption; and FIGS. 15-18 illustrate features related to a pluggable cipher suite.

FIG. 2 shows an illustrative example of a system that transmits a message from a sender to a recipient using an envelope-based encryption scheme, in accordance with an embodiment. A system diagram 200 shows a sender 202, a recipient 204, and a data encryption key server 206. The data encryption key server 206 maintains a DEK data store 208 and, in some implementations, a database of access logs 210. The DEK data store 208 includes encrypted DEKs stored by the sender 202 and the recipient 204. In some implementations, the stored DEKs are not encrypted. The stored encrypted DEKs are retrievable using a corresponding DEK reference (DEKR). In various implementations, the database of access logs 210 includes information associated with DEK lookup operations. The information can include, for each DEK lookup operation, the DEKR that was resolved, the encrypted DEK provided, the time of the operation, and information identifying the client that resolved the DEKR. The identifying information may include an IP address, hostname, MAC address, username, certificate information, or other credentials used by the requesting client. In certain implementations, the database of access logs 210 provides information used to recover from unintended key exposure. For example, the process illustrated in FIG. 4 can use information from the database of access logs 210 to recover from a compromised KEK.

In the example illustrated in FIG. 2, the sender 202 generates an envelope-encrypted message 212 containing a DEKR 214 and DEK-encrypted data 216. In one embodiment, the sender 202 generates a random DEK. In another embodiment, the sender 202 requests a DEK from the data encryption key server 206. In either case, the DEK is encrypted with a key encrypting key ("KEK") 218 and the encrypted DEK is provided to the data encryption key server 206. The data encryption key server 206 stores the encrypted DEK and returns a corresponding DEKR 214. The client uses the DEK to encrypt data to be transmitted to the recipient 204. The DEKR 214 and DEK-encrypted data 216 are formed into an envelope-encrypted message 212 and sent to the recipient 204. In some implementations, the DEK is not encrypted with a key encrypting key, and is stored in the data encryption key server 206 in an unencrypted form. In another implementation, the DEKR 214 is encrypted with the KEK 218, and decrypted by a matching KEK 220 at the recipient 204.

When the recipient 204 receives the envelope-encrypted message 212, the DEKR 214 and the DEK-encrypted data 216 are extracted from the envelope. If the DEKR 214 is encrypted, the KEK 220 is used to produce an unencrypted DEKR. The DEKR 214 is provided to the data encryption key server 206, and the data encryption key server 206 returns the corresponding DEK, in encrypted form, to the recipient 204. The recipient 204 uses the KEK 220 to decrypt the encrypted DEK. The decrypted DEK is used to decrypt the DEK-encrypted data 216, revealing the plaintext message data.

In some embodiments, KEK 218 and KEK 220 are a symmetric shared-secret cryptographic key. In another embodiment, KEK 218 and KEK 220 are collections of public-private cryptographic keys. For example, in one implementation, KEK 218 includes public cryptographic keys for potential message recipients, and a private cryptographic key associated with the sender 202. When the sender 202 generates an envelope encrypted message, the DEK that is sent to the data encryption key server 206 is encrypted using a public cryptographic key associated with the recipient 204. The public cryptographic key associated with the recipient 204 may also be used to encrypt the DEKR 214. When the recipient 204 receives the envelope encrypted message, a private cryptographic key associated with the recipient 204, that is part of the KEK 220, is used to decrypt the encrypted DEK and the encrypted DEKR.

In various embodiments, the envelope-based encryption scheme can be implemented within a single computing entity or with a different number of computer servers than shown in FIG. 2. For example, in some implementations, the data encryption key server 206 can be integrated into the sender 202. In another example, the sender 202, the recipient 204, and the data encryption key server 206 are integrated into a single device. In yet another example, the DEK data store 208 is maintained on a separate server in secure communication with the data encryption key server 206.

Various embodiments utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one-way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

FIG. 3 shows a process that, when performed, transmits an encrypted message from a sender to a recipient using envelope encryption, in accordance with an embodiment. A swim diagram 300 illustrates operations performed by the sender, the recipient, and a data encryption key server. At block 302, the sender encrypts a plaintext message with a DEK. In some implementations, the sender generates a random or pseudorandom DEK for each envelope. In another implementation, DEKs are reused for a number of envelopes before a new DEK is generated. In yet another implementation, the sender requests a DEK from the data encryption key server, and the data encryption key server generates and provides the DEK to the sender.

The generation of random or pseudorandom values can be accomplished through the use of hardware-based random number generators and pseudorandom number generators. Some pseudorandom number generators utilize a seed value that may be hardcoded, or read from a clock, memory location, or other peripheral. The seed value is provided to a pseudorandom number generator such as a linear feedback shift register or linear congruential generator. Hardware random number generators generate random values by sampling a physical phenomenon such as an electrical noise signal. In many implementations, random or pseudorandom number generators do not generate number sequences that are perfectly random and most random number generation techniques suffer from a degree of non-randomness. However, for most applications, known random and pseudorandom number generation techniques produce number sequences that are sufficiently random.

At block 304 the sender encrypts the DEK with a KEK, and sends the encrypted DEK to the data encryption key server. The KEK is a shared secret key maintained by both the sender and the recipient.

When the data encryption key server receives the encrypted DEK, the data encryption key server stores 306 the encrypted DEK, and then generates 308 a reference to the DEK called a DEKR. The DEKR can be an address, URI, URL, partial URL, signed or pre-signed URL, index, offset, index to key management system, or other identifier associated with the DEK. The data encryption key server returns the DEKR to the sender. At block 310, the sender places the DEKR into an envelope with the DEK-encrypted message. In some implementations, the sender encrypts the DEKR with the KEK and places the encrypted DEKR into the envelope with the DEK-encrypted message. The envelope containing the encrypted message and DEKR is sent 312 to the recipient. At block 314, the recipient receives the envelope containing the DEKR and the encrypted message. At block 316, the recipient provides the DEKR to the data encryption key server and requests the corresponding DEK.

The data encryption key server receives a request to resolve the DEKR from the recipient, and determines 318 whether the recipient is authorized to receive the corresponding DEK. In some embodiments, the data encryption key server determines whether the recipient is authorized based at least in part on a database of access controls. Access controls can include permissions that are based at least in part on the identity of the recipient, the network address of the recipient, the identity of the sender, and permissions provided by the sender with the DEK. When the recipient is not authorized to receive the DEK, the data encryption key server denies 320 the request of the recipient. When the recipient is authorized to receive the DEK, the data encryption key server provides 322 the encrypted DEK to the recipient.

When the recipient receives the encrypted DEK, the recipient decrypts 324 the encrypted DEK using the KEK. The recipient, at block 326, decrypts the encrypted message using the DEK. The resulting text message is available to the recipient.

In some embodiments, a data encryption key reference can be implemented as a pre-signed URL (generally, a pre-signed URI, although URLs are used throughout for illustration). In some environments, a referenced object can be shared with others by creating a pre-signed URL that uses authorized security credentials to grant a time-limited permission to the referenced objects. When creating a pre-signed URL for an object, security credentials, and object location such as a bucket, an object key, an HTTP method (GET to download the object), and an expiration date and time can be specified. The pre-signed URL may be valid for a specified duration. A receiver of a pre-signed URL can then access the object referred to by the pre-signed URL. For example, a private video in a private bucket can be shared with others by providing the others with a pre-signed URL.

In some embodiments, a pre-signed URI containing security credentials, an object location, and an object key is used as a data encryption key reference.

In various implementations, a pre-signed URL or other form of a pre-signed reference is used to access information stored on a server. When the pre-signed URL is presented to the server, the server confirms the validity of the digital signature, and confirms that the signer is trusted by the server. In addition, the server checks that the pre-signed URL has not expired. If the pre-signed URL is expired the server does not provide the referenced content to the requester. Provided that any other conditions associated with the content or imposed by the server are met, the server provides the content to the requester.

FIG. 4 shows a process that, when performed by a data encryption key server, updates compromised encryption keys, in accordance with an embodiment. A process diagram 400 illustrates a process that can, in some situations, be used to mitigate the consequences of a compromised KEK. At block 402, the compromised KEK is detected. A compromised KEK can be detected in a variety of ways. In some situations, a compromised KEK is detected when a system operator administrator finds secure data in the possession of unauthorized parties. In some embodiments, a compromised KEK is detected by examining access logs associated with a data encryption key server such as access logs 210 of FIG. 2. In some embodiments, a compromised KEK is detected when an unauthorized client attempts to resolve DEKRs. At block 404, the data encryption key server blocks further resolution of DEKRs, protecting uncompromised DEKs from being released. The data encryption key server generates 406 a new KEK. In some implementations, the data encryption key server is provided with a new KEK by a system administrator or other authoritative source.

At block 408, the data encryption key server begins a loop that iterates over the stored encrypted DEKs that were encrypted with a compromised KEK. The data encryption key server determines 410 whether a particular DEK is compromised. In some embodiments, the data encryption key server determines whether a particular DEK is compromised using a database of access logs. For example, when the database of access logs indicates that the particular DEK was provided to a compromised client, the particular DEK is determined to be compromised. In another example, when the database of access logs indicates that the particular DEK was provided to an unauthorized client, the particular DEK is determined to be compromised. In yet another example, when the database of access logs indicates that the particular DEK was resolved at a time after the KEK was compromised, the particular DEK is determined to be compromised. In yet another example, when the database of access logs indicates that the particular DEK has not been resolved by any client, the particular DEK is determined to be not compromised.

When a particular DEK is determined to be compromised, the data encryption key server generates 412 a new DEK. Any data records that are encrypted with the compromised DEK are re-encrypted 414 with the new DEK. In some embodiments, the data encryption key server has access to the data records and performs the re-encryption. In another embodiment, the data encryption key server notifies the owner of the potentially compromised data records, and provides the new DEK so that the owner of the potentially compromised data records is able to perform the re-encryption. At block 416, the data encryption key server encrypts the new DEK with the new KEK, and updates the DEK data store so that future resolutions of the DEKR associated with the compromised DEK are resolved to the new DEK.

When a particular DEK is determined to be not compromised, the data encryption key server re-encrypts 418 the particular DEK with the new KEK. The DEK data store is updated with the re-encrypted DEK so that future resolutions of the DEKR associated with the particular DEK are resolved to the re-encrypted DEK. DEK-encrypted data contained in envelopes or records need not be re-encrypted, and in many embodiments, DEK-encrypted data associated with uncompromised DEKs is not re-encrypted.

At decision block 420, the data encryption key server determines whether there are more DEKs to be examined. When there are more DEKs to be examined, execution loops back to block 408, and additional DEKs are examined. When there are not more DEKs to be examined, execution proceeds to block 422 and the new KEK is distributed to unauthorized clients. In some embodiments, the new KEK is distributed using a secure public-private key protocol. In another embodiment, the new KEK is distributed on tangible computer-readable media. After the new KEK is distributed, the data encryption key server deletes the KEK. At block 424, resolution of DEKRs to encrypted DEKs is re-enabled.

The envelope-based encryption scheme shown and illustrated in FIGS. 2-4 is applicable to a variety of applications that transfer, store, and manage encrypted data.

Figure 5:
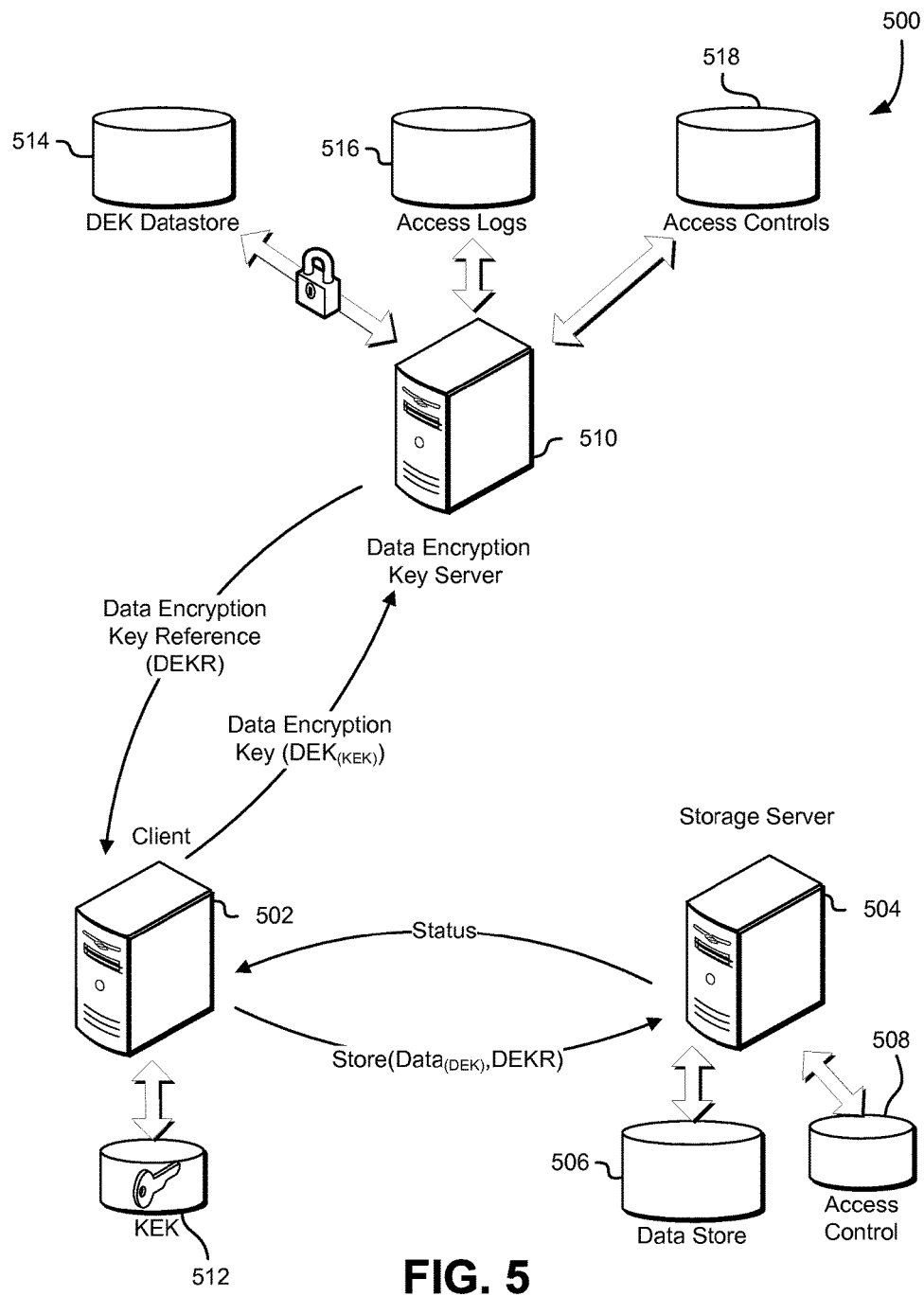
FIG. 5 shows an illustrative example of a storage service that uses client-side envelope encryption, with a client that is storing data, in accordance with an embodiment.

FIG. 5 shows an illustrative example of a storage service that uses client-side envelope encryption, with a client that is storing data, in accordance with an embodiment. A diagram 500 includes a client 502 that uses an envelope-based encryption scheme to communicate with a storage server 504. The storage server 504 provides data storage services to the client 502. Data is retained in a data store 506 that is connected to the storage server 504. The data store 506 can be implemented using one or more hard disks, optical drives, solid-state storage units, flash memory units, or other tangible computer-readable data storage devices. A database of access control information 508 is used by the storage server 504 to authorize client requests for stored data. As part of the envelope-based encryption scheme, the client 502 accesses a data encryption key server 510 to resolve DEKRs to corresponding encrypted DEKs. The client 502 maintains a KEK 512. When more than one client is authorized to access particular data maintained by the storage server, each client has access to the same KEK 512. In some implementations, the KEK 512 is a pre-shared symmetric cryptographic key. In some embodiments, where more than one client is authorized to access the storage server, but the clients do not access the same data, each client can have its own unique KEK. The data encryption key server 510 has access to a DEK data store 514, a database of access logs 516, and a set of access controls 518. The DEK data store 514 retains encrypted DEKs provided by clients of the storage server 504. The database of access logs 516 retains information related to the storing of encrypted DEKs, and resolution of DEKRs. In various embodiments, the database of access logs 516 records when a particular DEK was stored on the data encryption key server, the client that stored the particular DEK on the data encryption server, and for each DEKR resolution request, the DEKR, the client that made the request, and whether the request was granted. The set of access controls 518 is used by the data encryption key server 510 to authorize resolution of DEKRs to encrypted DEKs by authorized clients. In various embodiments, the set of access controls 518 can include a list of authorized clients, a range of time periods when resolution is permitted or denied, particular sets of DEKRs that may be resolved by particular clients, and ownership information relating to particular DEKs. In some embodiments, a DEK-owner is permitted to change or delete the owned DEK.

When the client 502 stores data on the storage server 504, the client 502 generates a DEK and encrypts the data to be stored with the generated DEK. The DEK is encrypted with a KEK, and the encrypted DEK is sent to the data encryption key server 510. The data encryption key server 510 stores the encrypted DEK in the DEK data store 514, and returns a DEKR associated with the stored encrypted DEK. The client 502 sends a data storage message containing the DEK-encrypted data and the DEKR. In some implementations, the client 502 encrypts the DEKR with the KEK and sends the encrypted DEKR with the encrypted data. When the storage server 504 receives the data storage message, the storage server 504 authenticates the request based at least in part on the access control information 508. When the request is authorized, the storage server 504 stores the encrypted data and the DEKR in the data store 506, and returns a status message to the client 502.

Figure 6:
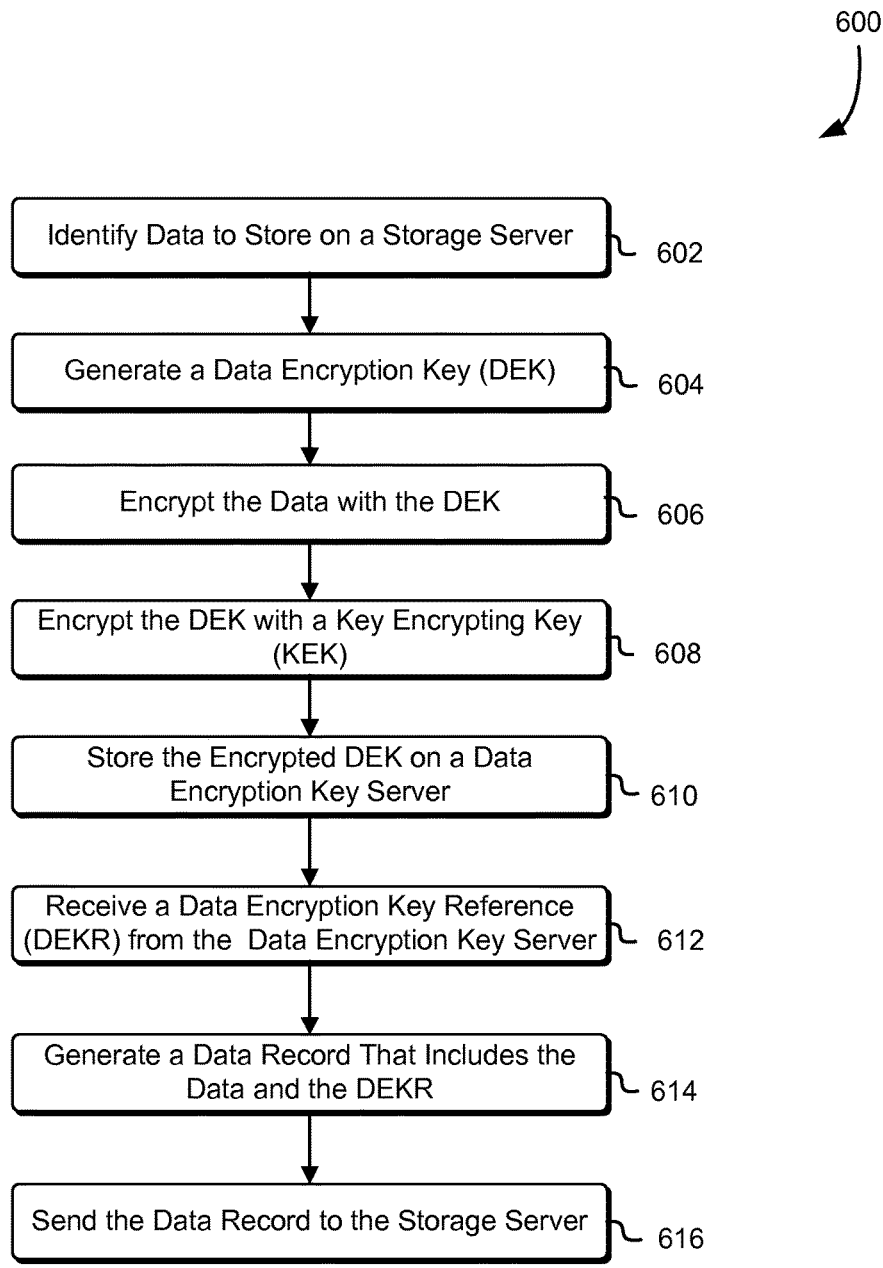
FIG. 6 shows a process that, when performed by a client, stores data to a storage service, in accordance with an embodiment.

FIG. 6 shows a process that, when performed by a client, stores data to a storage service, in accordance with an embodiment. A diagram 600 illustrates a process that begins at block 602. At block 602, a client identifies data to be stored on a storage server. At block 604, the client generates a DEK. In some implementations, a random DEK is generated. In another implementation, a DEK is provided by a data encryption key server. In some embodiments, DEKs are reused for a number of requests before a new DEK is generated or requested. The client encrypts 606 the identified data with the DEK, and then encrypts 608 the DEK with a KEK. The encrypted DEK is stored 610 on a data encryption key server. The data encryption key server returns a DEKR that is received 612 by the client. At block 614, the client generates a data record that includes the DEK-encrypted data, and the DEKR. The generated data record is then sent 616 by the client to the storage server.

Figure 7:
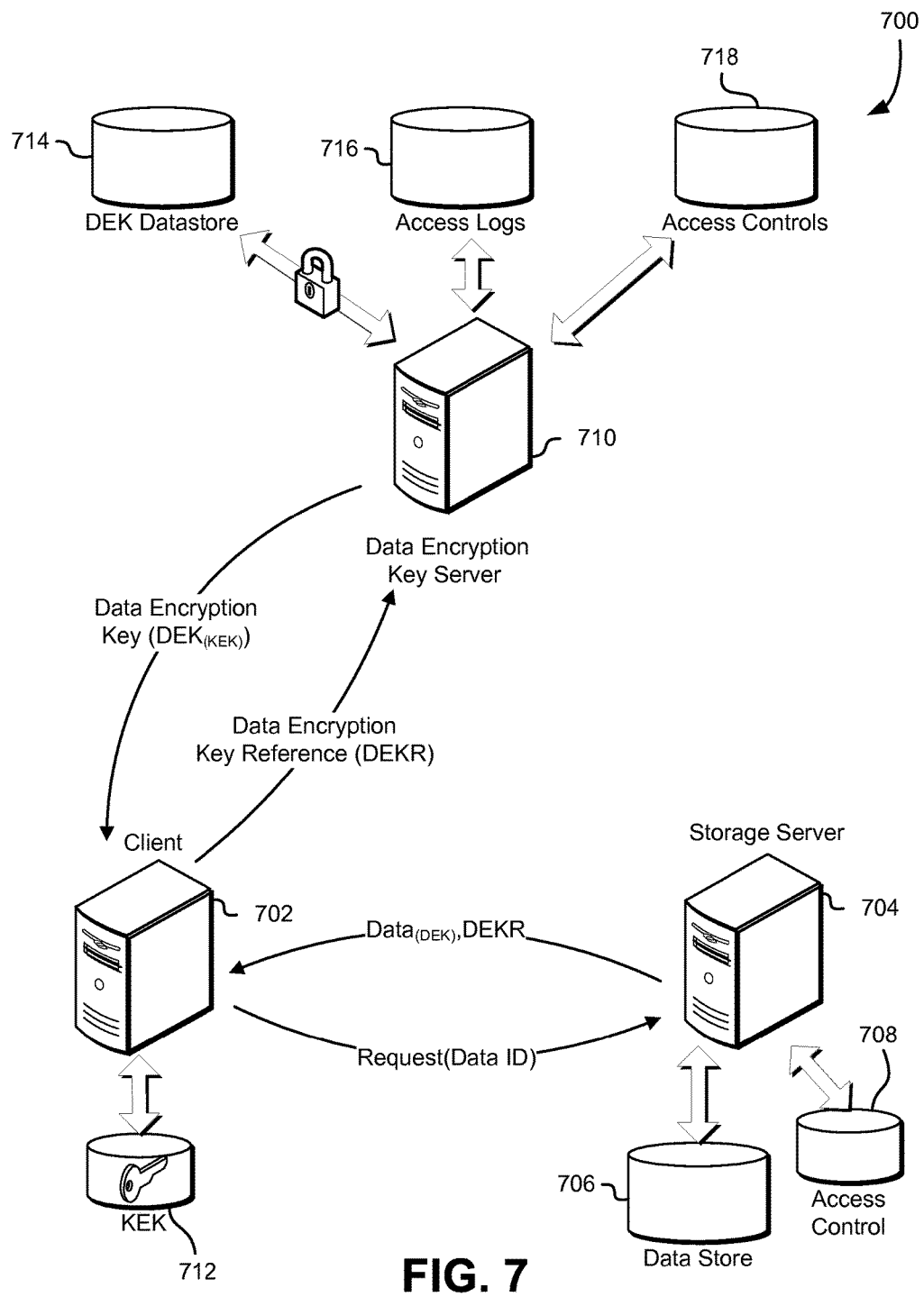
FIG. 7 shows an illustrative example of a storage service that uses client-side envelope encryption, with a client that is requesting data, in accordance with an embodiment.

FIG. 7 shows an illustrative example of a storage service that uses client-side envelope encryption, with a client that is requesting data, in accordance with an embodiment. A diagram 700 includes a client 702 that uses an envelope-based encryption scheme to communicate with a storage server 704. The storage server 704 provides data storage services to the client 702. Data is retained in a data store 706 that is connected to the storage server 704. The data store 706 can be implemented using one or more hard disks, optical drives, solid-state storage units, flash memory units, or other tangible computer-readable data storage devices. A database of access control information 708 is used by the storage server 704 to authorize client requests for stored data. As part of the envelope-based encryption scheme, the client 702 accesses a data encryption key server 710 to resolve DEKRs to corresponding encrypted DEKs. The client 702 maintains a KEK 712. When more than one client is authorized to access particular data maintained by the storage server, each client has access to the same KEK 712. In some embodiments, where more than one client is authorized to access the storage server, but the clients do not access the same data, each client can have its own unique KEK. The data encryption key server 710 includes a DEK data store 714, a database of access logs 716, and a set of access controls 718. The DEK data store 714 retains encrypted DEKs provided by clients of the storage server 704. The database of access logs 716 retains information related to the storing of encrypted DEKs, and resolution of DEKRs. In various embodiments, the database of access logs 716 records when a particular DEK was stored on the data encryption key server, the client that stored the particular DEK on the data encryption server, and for each DEKR resolution request, the DEKR, the client that made the request, and whether the request was granted. The set of access controls 718 is used by the data encryption key server 710 to authorize resolution of DEKRs to encrypted DEKs by authorized clients. In various embodiments, the set of access controls 718 can include a list of authorized clients, a range of time periods when resolution is permitted or denied, particular sets of DEKRs that may be resolved by particular clients, and ownership information relating to particular DEKs. In some embodiments, a DEK-owner is permitted to change or delete the owned DEK.

When the client 702 retrieves data from the storage server 704, the client 702 sends a request for data to the storage server 704. The request for data identifies the requested data with a data identifier ("ID"). In some embodiments, the data ID is a volume identifier and an offset. In another embodiment, the data ID is an identifying key. In yet another embodiment, the data ID is a cylinder, head, and sector number. In yet another embodiment, the data ID is a single vector address. The storage server 704 authorizes the request based at least in part on the access control information 708. When the request is authorized, the storage server 704 locates the requested data using the data ID and returns the data in an encrypted form, along with DEKR. In some implementations, the DEKR is also encrypted. When the client receives the DEKR, the client decrypts the DEKR with the KEK 712 if the DEKR is encrypted, and sends the DEKR to the data encryption key server 710. The data encryption key server 710 returns the DEK in encrypted form to the client 702. The client 702 decrypts the DEK using the KEK 712 to reveal a decrypted DEK. The decrypted DEK is used to decrypt the encrypted data, thereby allowing the client to access the plaintext data.

Figure 8:
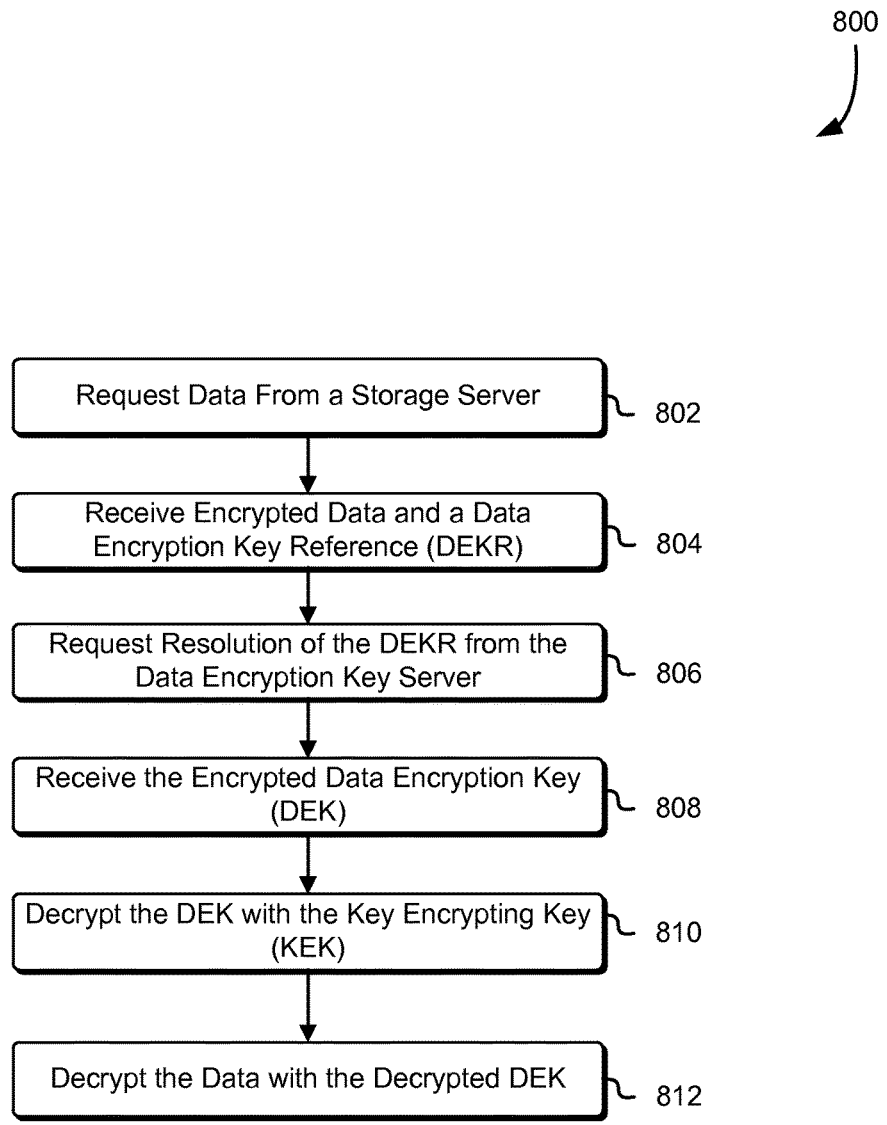
FIG. 8 shows a process that, when performed by a client, reads data from a storage service, in accordance with an embodiment.

FIG. 8 shows a process that, when performed by a client, reads data from a storage service, in accordance with an embodiment. A diagram 800 shows a process that starts at block 802. At block 802, a client requests data from a storage server. The request includes a data ID that, in various embodiments, can be an index, an offset, a volume and offset, an identifying key, a single vector address, a filename, or other address format. The storage server, after authorizing the request, responds to the request. The client receives 804 data encrypted with a DEK and a DEKR associated with the DEK. In some embodiments, the DEKR is encrypted with the client's KEK. When the client receives an encrypted DEKR, the encrypted DEKR is decrypted using the client's KEK. At block 806, the client sends the decrypted DEKR to the data encryption key server in a request for the associated DEK. The data encryption key server authorizes the request based at least in part on the access controls 718, and when the request is authorized, the data encryption key server sends the encrypted DEK to the client. The client receives 808 the encrypted DEK, and decrypts 810 the encrypted DEK using the KEK 712. At block 812, the client uses the decrypted DEK to decrypt the encrypted data provided by the storage server, revealing the plaintext data to the client.

Figure 9:
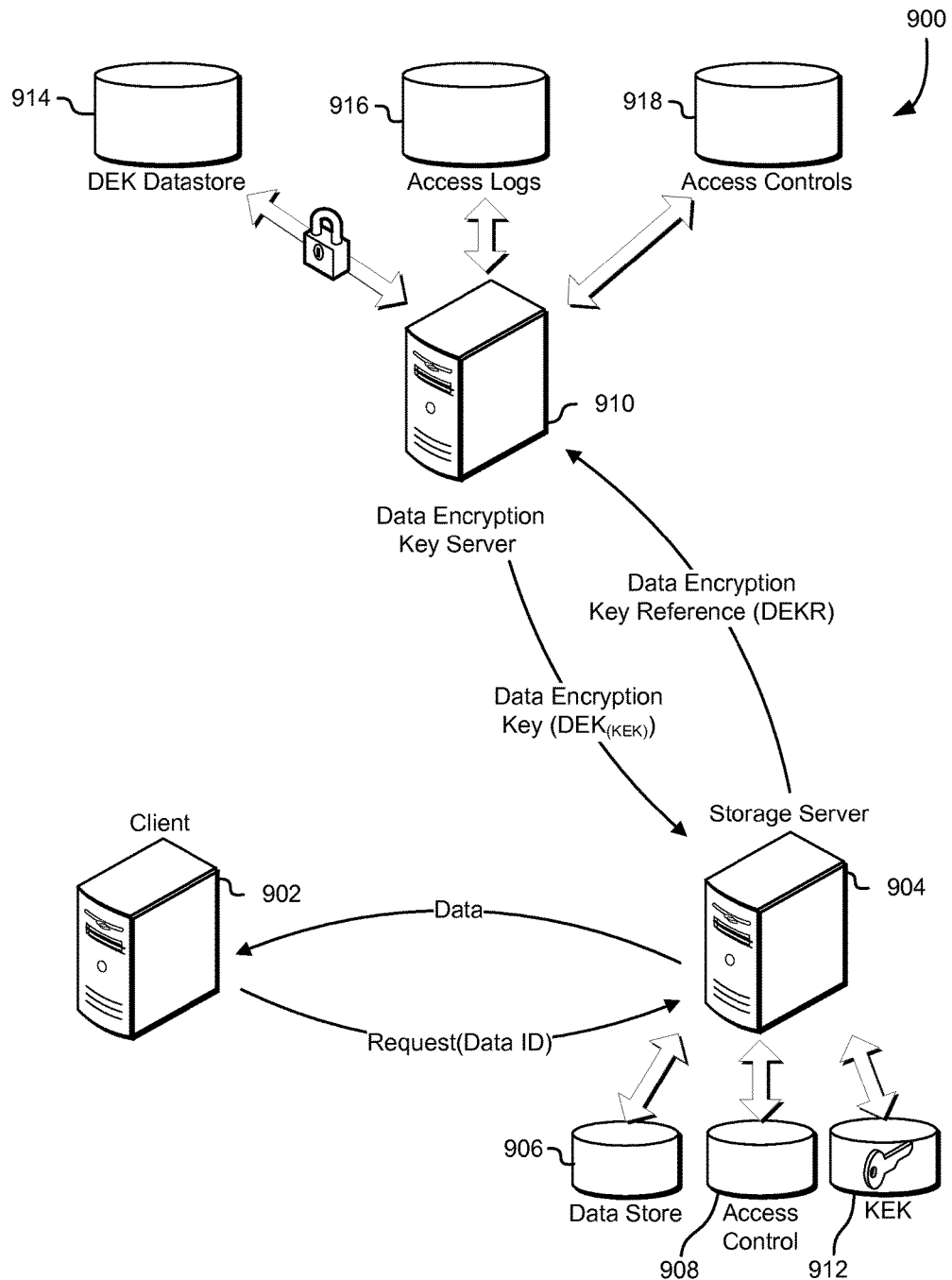
FIG. 9 shows an illustrative example of a storage service that uses server-side envelope encryption, with a client that is requesting data, in accordance with an embodiment.

FIG. 9 shows an illustrative example of a storage service that uses server-side envelope encryption, with a client that is requesting data, in accordance with an embodiment. A diagram 900 includes a client 902 that communicates with a storage server 904. The storage server 904 provides data storage services to the client 902. Data is retained in a data store 906 that is connected to the storage server 904. The data store 906 can be implemented using one or more hard disks, optical drives, solid-state storage units, flash memory units, or other tangible computer-readable data storage devices. A database of access control information 908 is used by the storage server 904 to authorize client requests for stored data. As part of the envelope-based encryption scheme, the storage server 904 accesses a data encryption key server 910 to resolve DEKRs to corresponding encrypted DEKs. The storage server 904 maintains a KEK 912. The data encryption key server 910 includes a DEK data store 914, a database of access logs 916, and a set of access controls 918. The DEK data store 914 retains encrypted DEKs provided by the storage server 904. The database of access logs 916 retains information related to the storing of encrypted DEKs, and the resolution of DEKRs. In various embodiments, the database of access logs 916 records when a particular DEK was stored on the data encryption key server, the server that stored the particular DEK on the data encryption server, and for each DEKR resolution request, the DEKR, the server that made the request, and whether the request was granted. The set of access controls 918 is used by the data encryption key server 910 to authorize resolution of DEKRs to encrypted DEKs by requesters. In various embodiments, the set of access controls 918 can include a list of authorized requesters, a range of time periods when resolution is permitted or denied, particular sets of DEKRs that may be resolved by particular requesters, and ownership information relating to particular DEKs. In some embodiments, a DEK-owner is permitted to change or delete the owned DEK.

In a particular embodiment, the storage server 904 uses an envelope-based encryption scheme when storing data to the data store 906. Communications between the client 902 and the storage server 904 can, in some embodiments, be exchanged in plaintext format. When the storage server 904 receives a request for data, the storage server 904 authorizes the request based at least in part on information stored in the database of access control information 908. When the request is authorized, the storage server 904 locates encrypted data and a DEKR that are associated with the requested data, within the data store 906. In some embodiments, the DEKR is encrypted using the KEK 912. When the DEKR is encrypted using the KEK 912, the storage server 904 decrypts the DEKR using the KEK 912. The decrypted KEK is provided to the data encryption key server 910, in the form of a request for the associated DEK. The data encryption key server 910 authorizes the request based at least in part on information contained within the set of access controls 918. When the request is authorized, the data encryption key server 910 provides the requested encrypted DEK that is associated with the provided DEKR to the storage server 904. The data encryption key server 910 updates the database of access logs 916 to record that the storage server 904 resolved the DEKR to the DEK. The storage server 904 decrypts the encrypted DEK using the KEK 912. The decrypted DEK is used to decrypt the encrypted data requested by the client 902, and the decrypted data is provided to the client 902 by the storage server 904.

Figure 10:
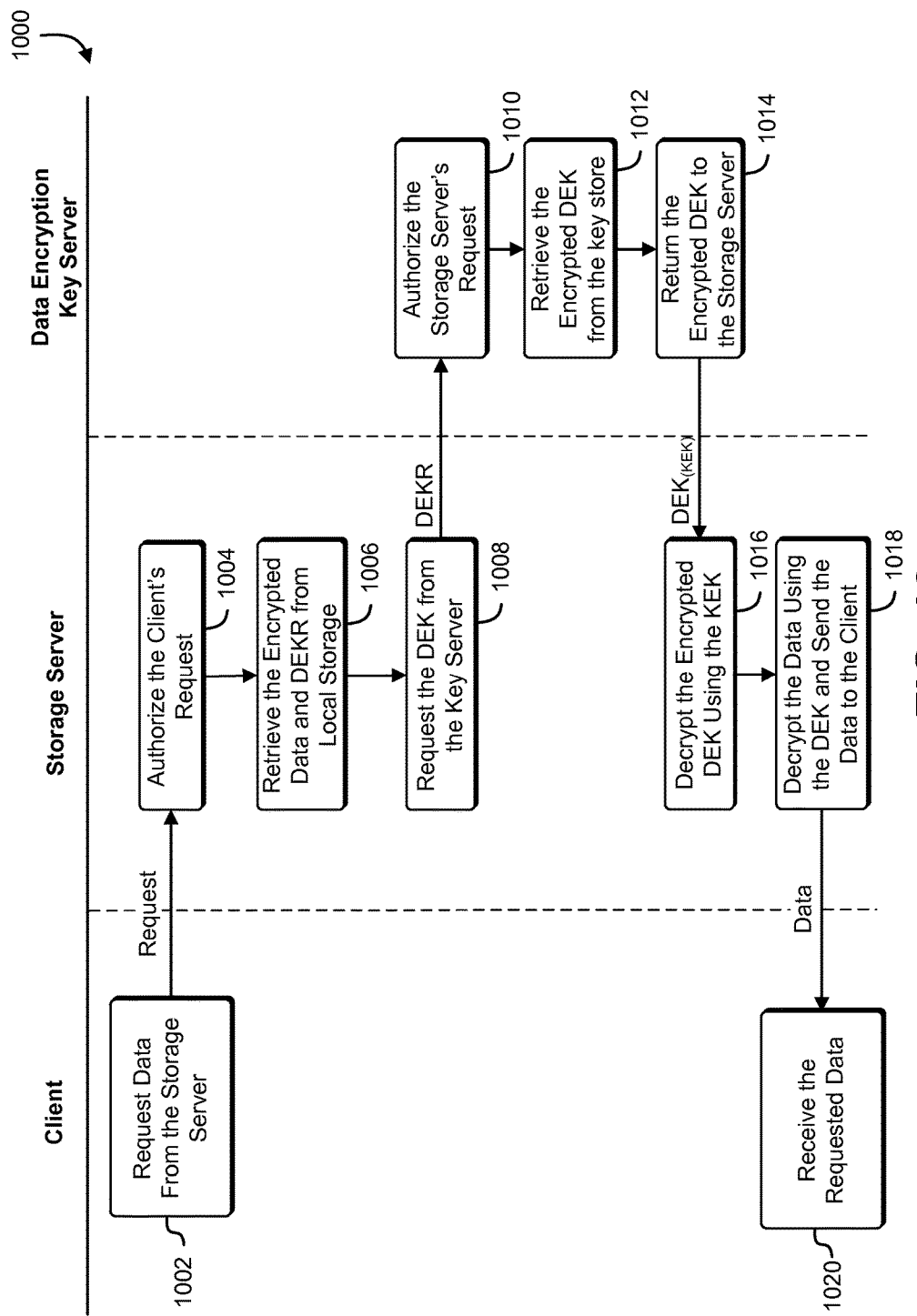
FIG. 10 shows a process that, when performed, reads data from a storage service that uses server-side envelope encryption, in accordance with an embodiment.

FIG. 10 shows a process that, when performed, reads data from a storage service that uses server-side envelope encryption, in accordance with an embodiment. A swim diagram 1000 shows operations performed by a client, a storage server, and a data encryption key server. At block 1002, the client requests data from the storage server by sending a request that includes a data identifier. In various embodiments, the data identifier can be an address, offset, file name, tag, or other identifier.

When the storage server receives the request, the storage server authorizes 1004 the request based at least in part on access control information maintained by the storage server. The storage server retrieves 1006 encrypted data and a DEKR that are associated with the data identifier provided by the client. At block 1008, the storage server sends a request to resolve the DEKR to a DEK, to the data encryption key server.

When the data encryption key server receives the request from the storage server containing the DEKR, the data encryption key server authorizes 1010 the request based at least in part on access control information maintained by the data encryption key server. When the storage server's request is authorized, the data encryption key server retrieves 1012 the encrypted DEK that is associated with the provided DEKR, from a DEK data store. At block 1014, the data encryption key server provides the encrypted DEK to the storage server.

When the storage server receives the encrypted DEK from the data encryption key server, the storage server decrypts 1016 the encrypted DEK using a KEK known by the storage server. The decrypted DEK is used by the storage server to decrypt the encrypted data and the resulting plaintext data is sent 1018 to the client. At block 1020, the client receives the requested plaintext data.

Figure 11:
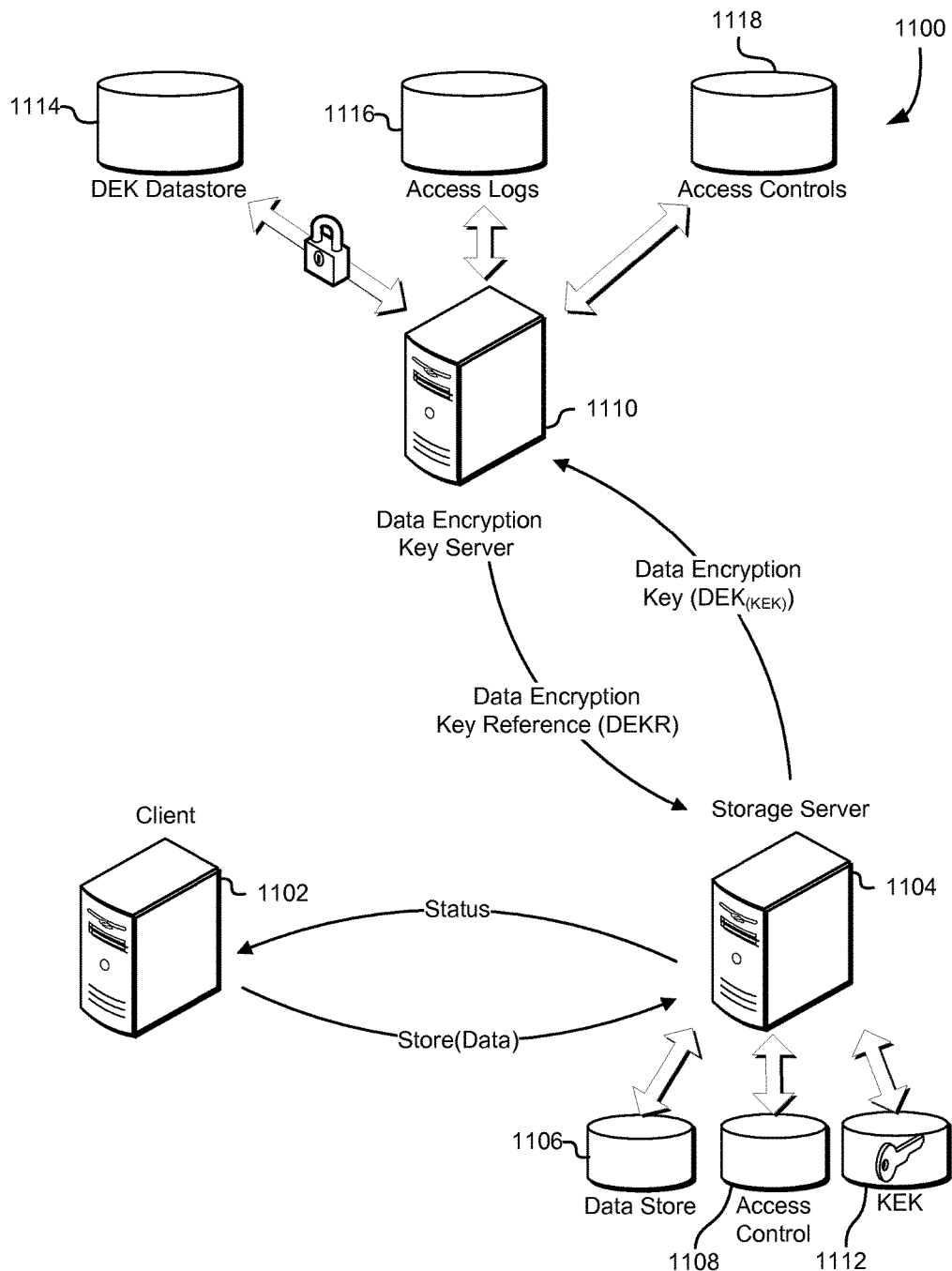
FIG. 11 shows an illustrative example of a storage service that uses server-side envelope encryption, with a client that is storing data, in accordance with an embodiment.

FIG. 11 shows an illustrative example of a storage service that uses server-side envelope encryption, with a client that is storing data, in accordance with an embodiment. A diagram 1100 includes a client 1102 that communicates with a storage server 1104. The storage server 1104 provides data storage services to the client 1102. Data is retained in a data store 1106 that is connected to the storage server 1104. The data store 1106 can be implemented using one or more hard disks, optical drives, solid-state storage units, flash memory units, or other tangible computer-readable data storage devices. A database of access control information 1108 is used by the storage server 1104 to authorize client requests for stored data. As part of the envelope-based encryption scheme, the storage server 1104 accesses a data encryption key server 1110 to resolve DEKRs to corresponding encrypted DEKs. The storage server 1104 maintains a KEK 1112. The data encryption key server 1110 includes a DEK data store 1114, a database of access logs 1116, and a set of access controls 1118. The DEK data store 1114 retains encrypted DEKs provided by the storage server 1104. The database of access logs 1116 retains information related to the storing of encrypted DEKs, and the resolution of DEKRs. In various embodiments, the database of access logs 1116 records when a particular DEK was stored on the data encryption key server, the server that stored the particular DEK on the data encryption server, and for each DEKR resolution request, the DEKR, the server that made the request, and whether the request was granted. The set of access controls 1118 is used by the data encryption key server 1110 to authorize resolution of DEKRs to encrypted DEKs by requesters. In various embodiments, the set of access controls 1118 can include a list of authorized requesters, a range of time periods when resolution is permitted or denied, particular sets of DEKRs that may be resolved by particular requesters, and ownership information relating to particular DEKs. In some embodiments, a DEK-owner is permitted to change or delete the owned DEK.

In a particular embodiment, the storage server 1104 provides data storage services to a client 1102. The storage server 1104 retains stored data within the data store 1106 using an envelope-based encryption scheme. When the client 1102 stores data on the storage server 1104, the client 1102 sends a storage request, containing the data and a data identifier, to the storage server 1104. The storage server 1104 authorizes the request based at least in part on the access control information 1108. When the client's request is authorized, the storage server 1104 generates a DEK, and encrypts the data using the generated DEK. The DEK is then encrypted using the KEK 1112, and provided to the data encryption key server 1110 with a request for an associated DEKR. The data encryption key server 1110 authorizes the request based at least in part on the set of access controls 1118. When the request is authorized, the data encryption key server 1110 generates a DEKR, and stores the provided encrypted DEK in the DEK data store 1114. Stored encrypted DEKs are maintained in the DEK data store 1114 with an index to their associated DEKRs. The data encryption key server 1110 provides the generated DEKR to the storage server 1104. The data encryption key server 1110 updates the database of access logs 1116 to show that the storage server 1104 provided the DEK, and was provided with an associated DEKR. The storage server 1104 stores the provided DEKR along with the DEK-encrypted data in the data store 1106, indexed by the provided data identifier.

Figure 12:
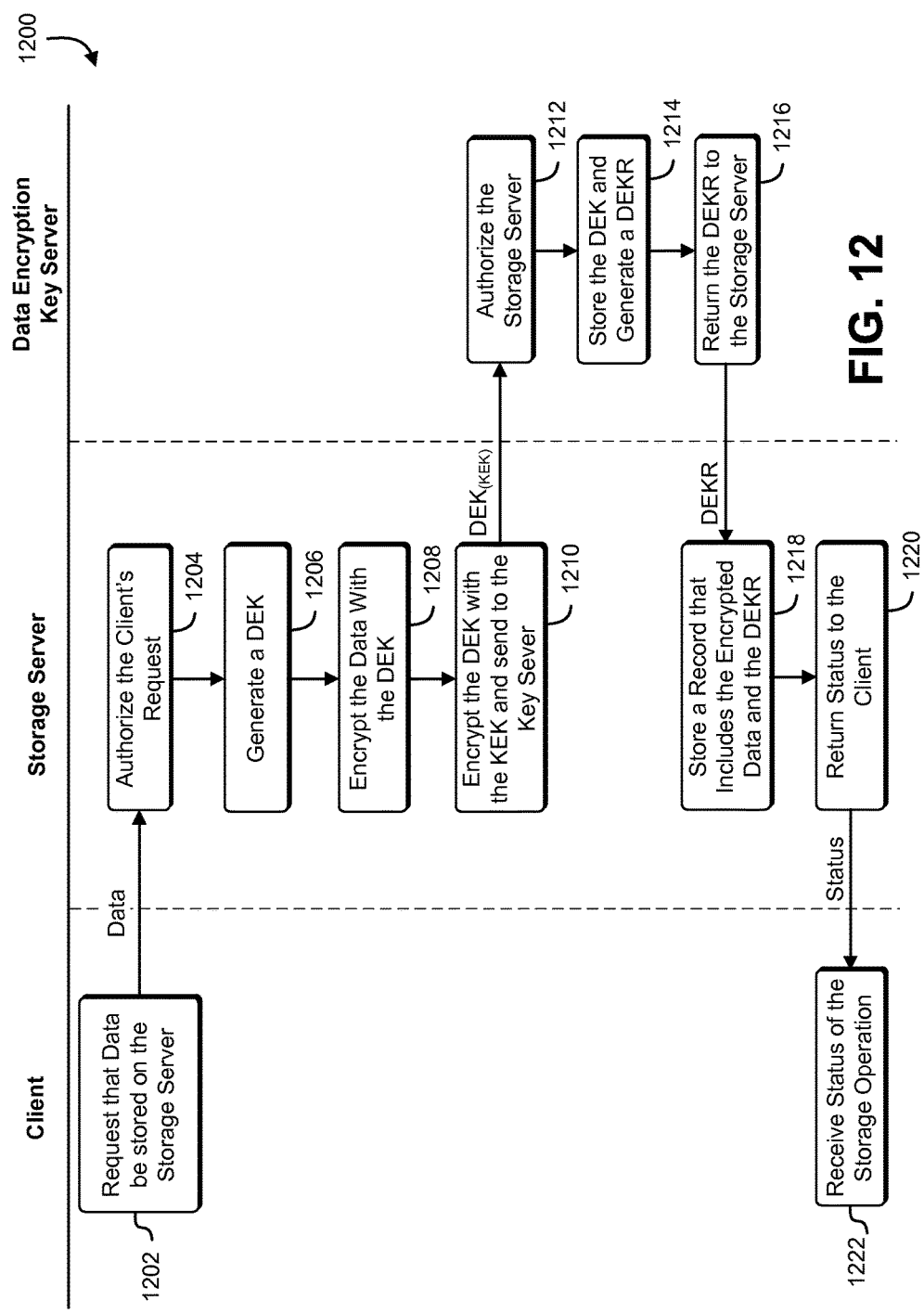
FIG. 12 shows a process that, when performed, reads data from a storage service that uses server-side envelope encryption, in accordance with an embodiment.

FIG. 12 shows a process that, when performed, reads data from a storage service that uses server-side envelope encryption, in accordance with an embodiment. A swim diagram 1200 shows operations performed by a client, a storage server, and a data encryption key server. At block 1202, the client sends a request to the storage server to store data. In some implementations, the request includes a data identifier that can be an address, an index, an offset, a file name, a single vector address, or other identifier.

When the storage server receives the request, the storage server determines 1204 whether the request is authorized. When the request is authorized, the storage server generates 1206 a DEK to be used for encrypting the data. In some implementations, the DEK is a random DEK. In another implementation, the DEK is reused from a prior request. In yet another implementation, the DEK is generated by the data encryption key server in response to a request. At block 1208, the storage server encrypts the data with the generated DEK. At block 1210, the DEK is encrypted with the server's KEK and provided to the data encryption key server with a request for a corresponding DEKR.

When the data encryption key server receives the request and the encrypted DEK, the data encryption key server determines 1212 whether the request is authorized based at least in part on access control information maintained by the data encryption key server. When the request is authorized, the data encryption key server stores 1214 the encrypted DEK in a DEK data store and generates a corresponding DEKR. At block 1216, the data encryption key server provides the generated DEKR to the storage server.

When the storage server receives the DEKR, the storage server stores 1218 the encrypted data along with the received DEKR. In some implementations, the received DEKR is encrypted with the KEK and then stored. At block 1220, the storage server returns a status message to the client that indicates whether the operation was successful. The client receives the status message at block 1222.

FIG. 13 shows an illustrative example of a storage service that uses server-side or client-side encryption based at least in part on a trust score, in accordance with an embodiment. A diagram 1300 includes a storage server 1302, a data encryption key server 1304, the first client 1306, and a second client 1308. The storage server 1302 has access to a data store 1310, a set of access controls 1312, and a KEK 1314. The first client 1306 has access to a KEK 1316. In some embodiments, the first client 1306 and the second client 1308 access a common set of data on the storage server 1302. In such embodiments, the KEK 1314 and the KEK 1316 have the same values. In another embodiment, the first client 1306 and the second client 1308 do not access common data stored on the storage server 1302, and the KEK 1314 can be a different value than the KEK 1316.

In certain embodiments, the storage server 1302 determines a trust score associated with each received request. Based at least in part on the determined trust score, the storage server 1302 determines whether to use server-side encryption or client-side encryption when responding to the request. In one embodiment, when the storage server 1302 determines that the trust score is greater than or equal to a threshold value, the storage server 1302 uses server-side encryption. When the storage server 1302 determines that the trust score is less than the threshold value, the storage server 1302 uses client-site encryption.

For example, the first client 1306 sends a request to the storage server 1302 and the trust score is less than the threshold value. As a result, in responding to the request, the storage server 1302 uses client-side encryption. In some embodiments, the first client 1306 uses an envelope-based encryption scheme such as the encryption scheme illustrated in FIG. 5. In another example, the second client 1308 sends a request to the storage server 1302, and the trust score for the request is greater than or equal to the threshold value. As a result, in responding to the second client's request, the storage server 1302 uses server-side encryption. In some embodiments, when processing the second client's request, the storage server 1302 uses an envelope-based encryption scheme such as the encryption scheme illustrated in FIG. 11.

In some embodiments, a particular client may produce some requests that result in the use of server-side encryption, and other requests that result in the use of client-side encryption. In another embodiment, a client may request client-side encryption regardless of the trust score assigned to a particular request by the storage server 1302. In yet another embodiment, for a particular client, server-side encryption is used when storing data to the storage server 1302, and client-side encryption is used when reading data from the storage server 1302.

In various embodiments, the trust score is determined based at least in part on one or more of the identity of the requesting client, the network address of the requesting client, the nature of the request, the particular data requested, the time of the request, and the credentials used by the requester.

FIG. 14 shows a process that, when performed by a server, determines whether client-side or server-side encryption will be used to fulfill a request, in accordance with an embodiment. A diagram 1400 shows a process that begins at block 1402. At block 1402, a storage server receives a request for data from a client. The storage server determines 1404 an initial trust score based at least in part on the identity of the client. For example, in some implementations, the storage server identifies the client using credentials provided by the client with the request. A database maintained by the storage server contains initial trust scores for various clients. At block 1406, the storage server modifies the trust score based at least in part on the origin of the request. The origin of the request can include, in various implementations, the network address of the client, the client name, or other origin-related information. For example, in some implementations, the server maintains a list of trusted IP or whitelisted address ranges. When the request originates from a trusted or whitelisted IP address, the trust score is increased. In another implementation, the storage server maintains a list of blacklisted IP addresses. When the request originates from a blacklisted IP address, the trust score is decreased. At block 1408 the trust score is modified based at least in part on the time of the request. For example, the trust score may be increased for requests that occurred during business hours, and the trust score may be decreased on weekends. At block 1410 the trust score is modified based at least in part on the freshness of the credentials provided with the request by the client. For example, when recently issued credentials are provided, the trust score may be increased. When stale credentials are provided, the trust score may be decreased. In some implementations, the initial trust score is determined based at least in part on the physical location of the client, the connection type used by the client, the data that is requested, or other properties of the request.

In various embodiments, trust scores can be determined in other ways. For example, in some implementations the trust score begins at an initial value determined by the credentials of the client, the security of the communication protocol used to communicate with the client, the network address of the client, and other factors described above. Over time, the security of the connection is monitored by the server. If information provided by the server is not misused, and if the client's use of server resources is not abusive, the trust score is increased over time. Eventually, when the trust score exceeds a threshold value, description operations are shifted to the server and the client is provided with plaintext responses. In some implementations, the trust score is calculated based on a variety of factors. In one example, a base trust score of 100 is assigned to a connection. If the connection uses strong encryption, the trust score is multiplied by 2.0. If the connection uses week encryption, the trust score is multiplied by 1.5. If the client provides a username and password that was issued less than 30 days ago, the trust score is multiplied by 2.0. If the client provides a username and password that were issued between 30 and 90 days ago the trust score is multiplied by 1.5. If the client provides a guest username and password, the trust score is multiplied by 0.7. If the network address of the client is contained in a white list of trusted network addresses, the trust score is multiplied by 3.0. If the requests received from the client request particularly sensitive information, the trust score is multiplied by 0.3. If requests are received from the client outside normal business hours, the trust score is multiplied by 0.5. Once these factors are applied to the trust score, the final trust scores compared to the threshold value to determine whether responses to the client should be returned in plaintext or encrypted form. In yet another implementation modifiers are added or subtracted from the trust score. For example if the client provides a username and password that were issued less than 30 days ago 25 points may be added to the trust score.

Once the trust score has been determined, the storage server determines 1412 whether the trust score is greater than a threshold value. When the trust score is greater than a threshold value, the storage server performs server-side decryption of the requested data on behalf of the requesting client. In some embodiments, at block 1414, the storage server retrieves an encrypted DEK from a key server using a DEKR. The encrypted DEK is decrypted 1416 using a KEK to reveal a decrypted DEK. The decrypted DEK is used to decrypt 1418 the requested data, producing the plaintext data. At block 1420, the plaintext data is provided to the client.

When the trust score is not greater than a threshold value, the storage server provides encrypted data to the client and relies upon client-side decryption. In some implementations, the storage server retrieves 1422 the encrypted data and the DEKR from a data store accessible to the storage server, and provides 1424 the encrypted data and the DEKR to the client without modification.

In some embodiments, clients may use various forms of client-side encryption that are imposed by the storage server. As a result, in some situations a particular client may not have a protocol installed that is necessary to access the storage server. In such embodiments, a pluggable cipher suite may be used to extend the encryption functionality available to the client.

Figure 15:
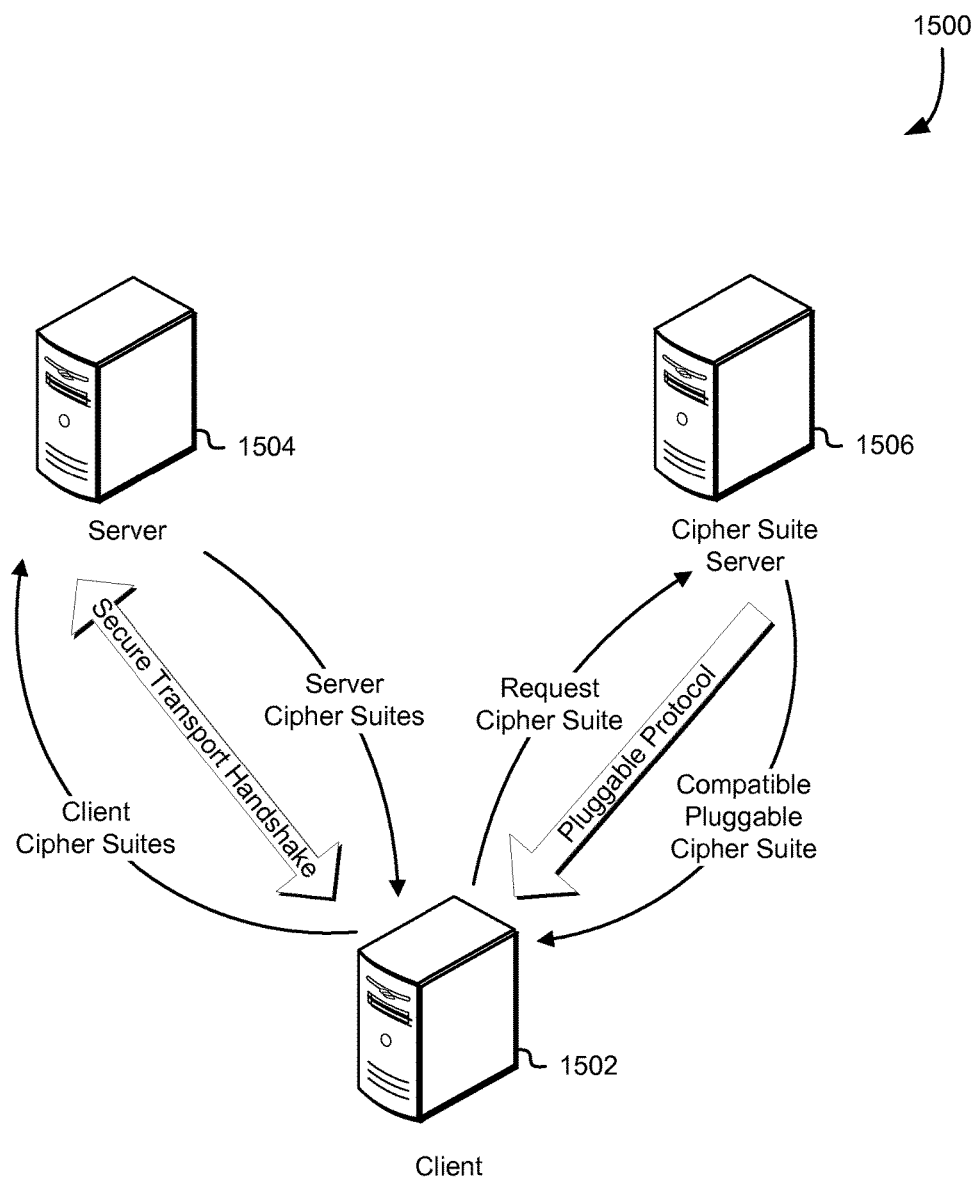
FIG. 15 shows an illustrative example of a system that provides a pluggable cipher suite to a client, in accordance with an embodiment.

FIG. 15 shows an illustrative example of a system that provides a pluggable cipher suite to a client, in accordance with an embodiment. A diagram 1500 shows a client 1502, a server 1504, and a cipher suite server 1506. The client 1502 and the server 1504 perform a secure transport handshake, such as a TLS handshake, that negotiates a set of supported cipher suites. For example, in one implementation, the client 1502 sends a list of cipher suites that are supported by the client 1502 to the server 1504. In some scenarios, the server 1504 supports one or more of the set of supported cipher suites provided by the client, and the server 1504 selects a particular cipher suite from the set of supported cipher suites. In another scenario, the server 1504 does not support any cipher suite of the set of supported cipher suites provided by the client. In various embodiments, the client 1502 supports a set of pluggable capabilities. The pluggable capabilities are provided by a sandbox environment such as a JVM, JavaScript environment, virtual machine, script engine, or other execution environment.

In another embodiment, the client 1502 receives a list of cipher suites that are supported by the server 1504. When the client 1502 supports one or more of the cipher suites supported by the server 1504, the client 1502 selects a particular cipher suite from the list of cipher suites that are supported by the server 1504. In some implementations, the client 1502 selects a particular cipher suite based on a preference order that can be maintained by the client 1502, or in another implementation, supplied by the server 1504. The client 1502 obtains an implementation of the identified cipher suite, in some implementations, by requesting a pluggable cipher suite from a cipher suite server 1506. In another implementation, the client 1502 obtains and implementation of the identified cipher suite by requesting a pluggable cipher suite from the server 1504.

When the server 1504 does not support a cipher suite that is supported by the client 1502, a pluggable cipher suite can be provided to the client 1502. In one embodiment, the server 1504 includes a library of downloadable pluggable cipher suites. The client 1502 communicates the set of pluggable capabilities to the server 1504. Based at least in part on the set of pluggable capabilities, the server 1504 identifies a particular downloadable pluggable cipher suite that is compatible with the client 1502. The server 1504 provides the compatible downloadable pluggable cipher suite to the client 1502. The client 1502 installs the provided cipher suite, which enables the client to support a cipher suite that is supported by the server 1504. In another embodiment, the server 1504 provides a list of server cipher suites and at least one reference to a cipher suite server. For example, in one implementation, the reference to a cipher suite server is a URL. Upon receiving the list of server cipher suites, the client 1502 provides the list of server cipher suites, and the client set of pluggable capabilities, to the cipher suite server 1506, and requests a compatible pluggable cipher suite. The cipher suite server 1506 identifies a compatible pluggable cipher suite from a library of cipher suites maintained by the cipher suite server 1506, and the identified compatible pluggable cipher suite is provided to the client 1502.

In some implementations, the server 1504 selects a plurality of cipher suites from the set of cipher suites that are supported by the server. One or more of the set of cipher suites may be unsupported by the client 1502, and one or more pluggable cipher suites may be used to extend the communication capabilities of the client 1502 so that the client 1502 supports the set of cipher suites selected by the server 1504. Communications between the client 1502 and the server 1504 may use some or all of the selected set of cipher suites. In one environment, sequential connections between the client 1502 and the server 1504 use different cipher suites. In another environment, a particular connection between the client 1502 and the server 1504 uses a sequence of cipher suites that change over the course of the transmission.

In some embodiments, the client 1502 and server 1504 share a cryptography algorithm hopping model that indicates to both the client 1502 and the server 1504 how to move among cryptographic algorithms over time. The cryptography algorithm hopping model can be included in a cipher suite negotiated by the server. The cryptography algorithm hopping model may take various forms in accordance with various embodiments described in U.S. patent application Ser. No. 14/483,070, filed Sep. 10, 2014, entitled "Cryptography Algorithm Hopping."

Figure 16:
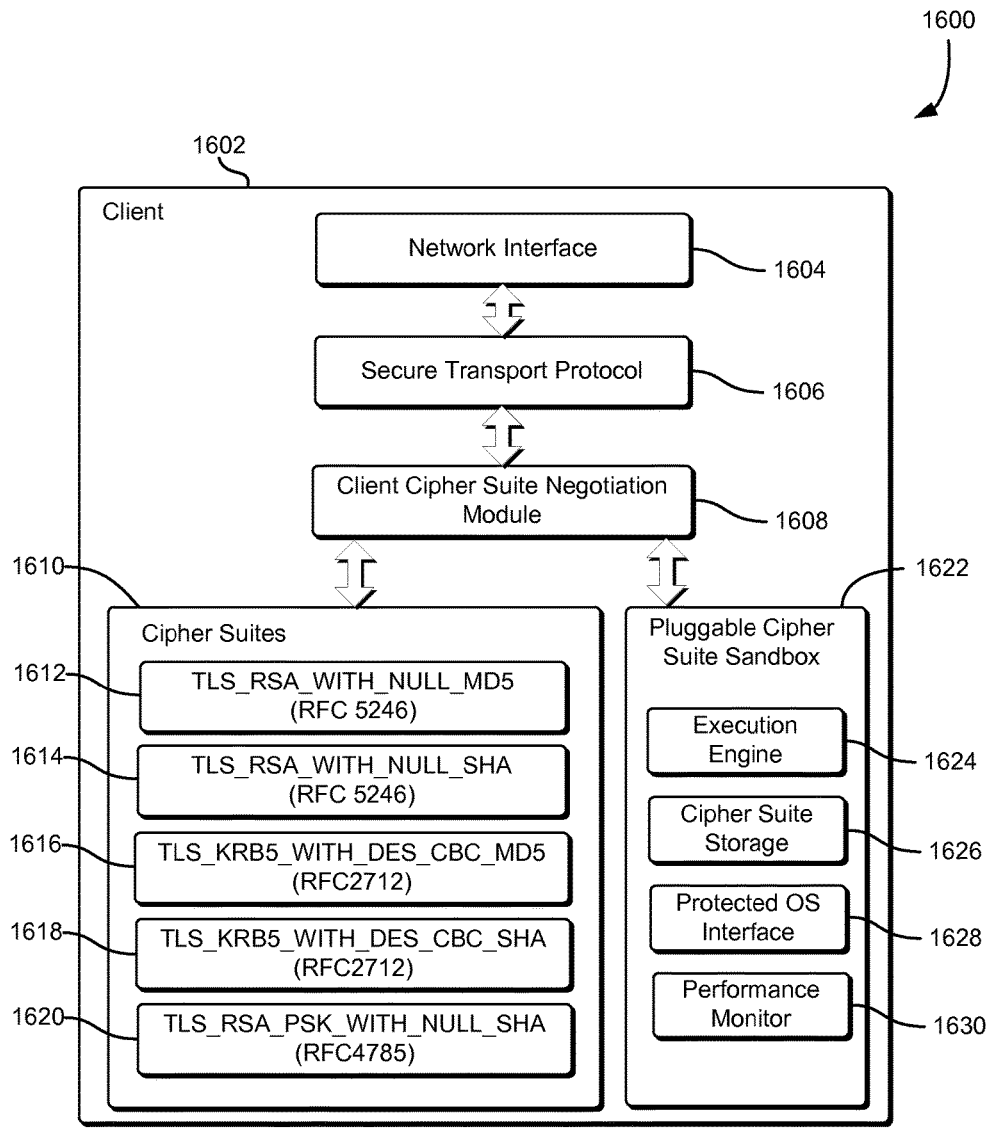
FIG. 16 shows an illustrative example of a client that uses pluggable cipher suites, in accordance with an embodiment.

FIG. 16 shows an illustrative example of a client that uses pluggable cipher suites, in accordance with an embodiment. A block diagram 1600 illustrates various components of a client 1602 that supports a set of pluggable capabilities. A network interface 1604 such as an Ethernet card, wireless network adapter, modem, or other interface provides a physical connection to a computer network. The client 1602 implements a secure transport protocol 1606 such as transport layer security ("TLS"). The secure transport protocol 1606 provides an application programming interface ("API") that is usable by applications running on the client 1602. The secure transport protocol 1606 uses a client cipher suite negotiation module 1608 to determine particular cipher suites that can be used over particular connections established with other clients, servers, or other network endpoints. For example, when the client 1602 establishes network connection to a server, the client cipher suite negotiation module 1608 communicates a list of supported cipher suites to the server, and in some scenarios, the server responds with a cipher suite that is supported by both the client 1602 and the server. In a particular example, the client 1602 supports a number of cipher suites 1610. The supported cipher suites 1610 can include envelope-based encryption schemes such as those described above. In the example shown in FIG. 16, the supported cipher suites 1610 include selected cipher suites defined in the TLS cipher suite registry. The supported cipher suites include TLS_RSA_WITH_NULL_MD5 1612, TLS_RSA_WITH_NULL_SHA 1614, TLS_KRB5_WITH_DES_CBC_MD5 1616, TLS_KRB5_WITH_DES_CBC_SHA 1618, and TLS_RSA_PSK_WITH_NULL_SHA 1620. The above cipher suites are relatively weak when compared to newer alternative cipher suites and in some environments will be rejected by a server as not sufficiently secure. Additional information regarding the cipher suites above can be found in RFC2712, RFC4785, and RFC 5246, which are incorporated herein by reference.

In certain situations, when the client 1602 is connecting to a server, the client 1602 may be unable to negotiate a supported cipher suite for the connection because there is not a mutually supported cipher suite supported by both the client 1602 and the server. In such situations, the client cipher suite negotiation module 1608 can utilize a pluggable cipher suite sandbox 1622 to install an additional cipher suite onto the client 1602. The pluggable cipher suite sandbox 1622 includes an execution engine 1624, a cipher suite storage module 1626, a protected OS interface 1628, and a performance monitor 1630. The execution engine 1624 executes instructions that implement a particular cipher suite. In various implementations, the execution engine 1624 can be a JavaScript engine, a JVM, a processor in a virtual machine, or other script engine. The cipher suite storage module 1626 can be implemented as a directory on a storage system connected to the client 1602, or as a separate memory device. The protected OS interface 1628 provides pluggable cipher suites with access to operating system functionality such as storage resources, memory resources, peripherals, network interfaces, or other operating system faculties. The performance monitor 1630 monitors the operation of the sandbox and allows the client to adapt to changes in performance or resource demands of conflicting pluggable cipher suites. In some implementations, the client 1602 uses information obtained through the performance monitor 1630 to select a particular pluggable cipher suite, or two to select a particular pluggable cipher suite sandbox from a number of available pluggable cipher suite sandboxes.

Figure 17:
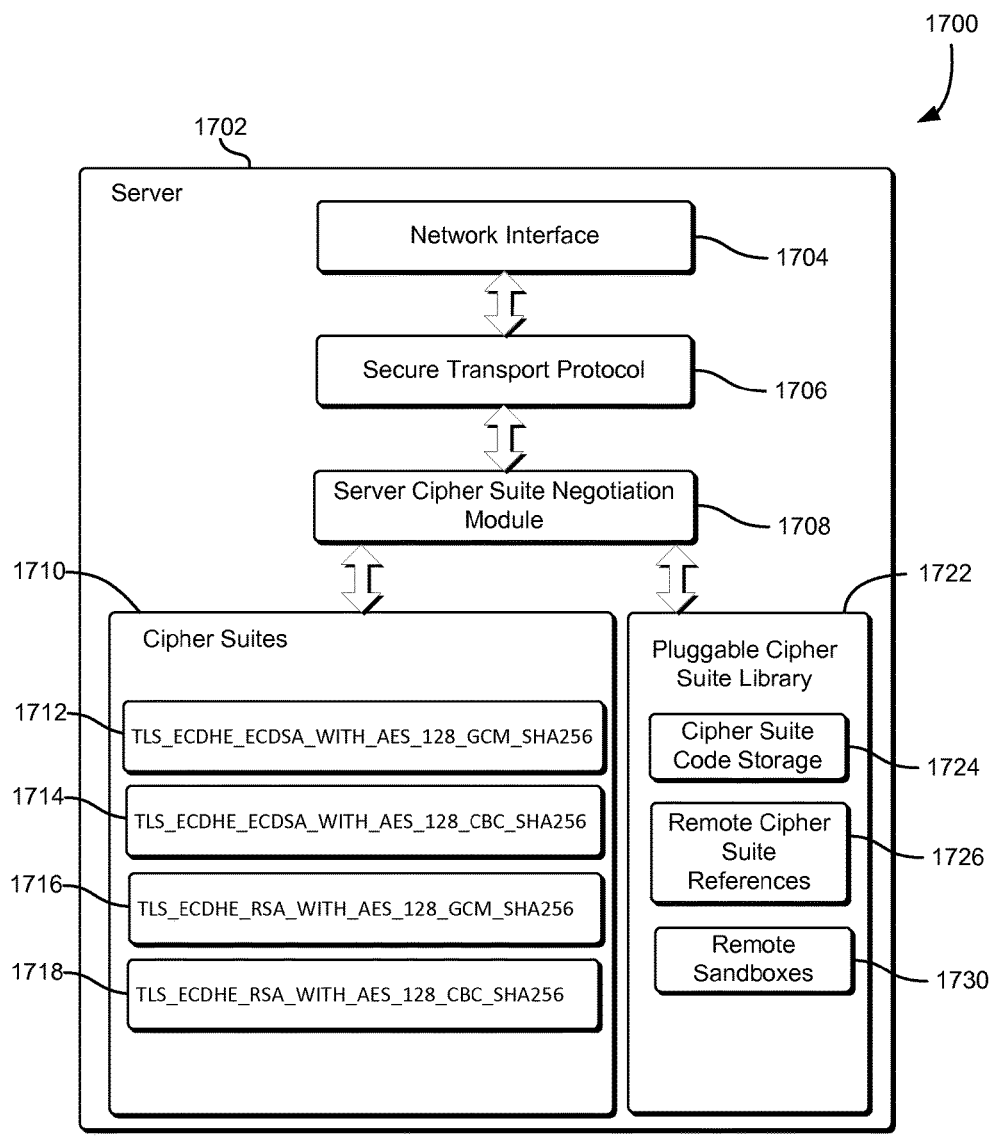
FIG. 17 shows an illustrative example of a server that provides pluggable cipher suites, in accordance with an embodiment.

FIG. 17 shows an illustrative example of a server that provides pluggable cipher suites, in accordance with an embodiment. A block diagram 1700 shows various components of a server 1702. The server 1702 includes a network interface 1704. The network interface 1704, in some implementations, is a network interface card, a wireless network interface, or other hardware interface device. A secure transport protocol module 1706, such as TLS, provides an API for applications running on the server. A cipher suite negotiation module 1708 negotiates a supported cipher suite when a client connects to the server 1702. The server supports a set of cipher suites 1710. The supported cipher suites are implemented by a number of software modules that include TLS_ECDHE_ECDSA_WITH_AES_128_GCM_SHA256 1712, TLS_ECDHE_ECDSA_WITH_AES_128_CBC_SHA256 1714, TLS_ECDHE_RSA_WITH_AES_128_GCM_SHA256 1716, TLS_ECDHE_RSA_WITH_AES_128_CBC_SHA256 1718. Additional information regarding the cipher suites above can be found in RFC5288, RFC5289, and RFC 5246 which are incorporated herein by reference. In some implementations, the server 1702 supports an envelope-based encryption scheme such as the envelope-based encryption scheme described above. The server 1702 includes a pluggable cipher suite library 1722. The pluggable cipher suite library 1722 is used by the server cipher suite negotiation module 1708 to supply clients with pluggable cipher suites that are compatible with cipher suites supported by the server 1702. The pluggable cipher suite library includes a cipher suite code storage module 1724 that maintains a number of pluggable cipher suites that can be provided to clients. The cipher suite code storage module can be implemented as a directory on an existing storage device on the server, or as a dedicated storage device. The pluggable cipher suite library 1722 maintains a number of remote cipher suite references 1726. The remote cipher suite references 1726 can be used by the cipher suite negotiation module 1708 to locate additional providers of pluggable cipher suites. In some embodiments, when the server 1702 cannot locate a compatible pluggable cipher suite, the server 1702 provides the client with one or more remote cipher suite references as alternative sources of pluggable cipher suites. In additional implementations, the pluggable cipher suite library 1722 includes one or more remote sandboxes 1730. The remote sandboxes 1730 may be used by a client that does not have sufficient resources to execute a particular pluggable cipher suite. In certain situations, a client downloads a pluggable cipher suite library to a remote sandbox running on the server 1702, or on a different server. A remotely running pluggable cipher suite relays transmissions from the client to the server using a supported cipher suite. Communications between the client and the remotely running pluggable cipher suite can be accomplished using a cipher suite supported by the client and the remote sandbox server.

Figure 18:
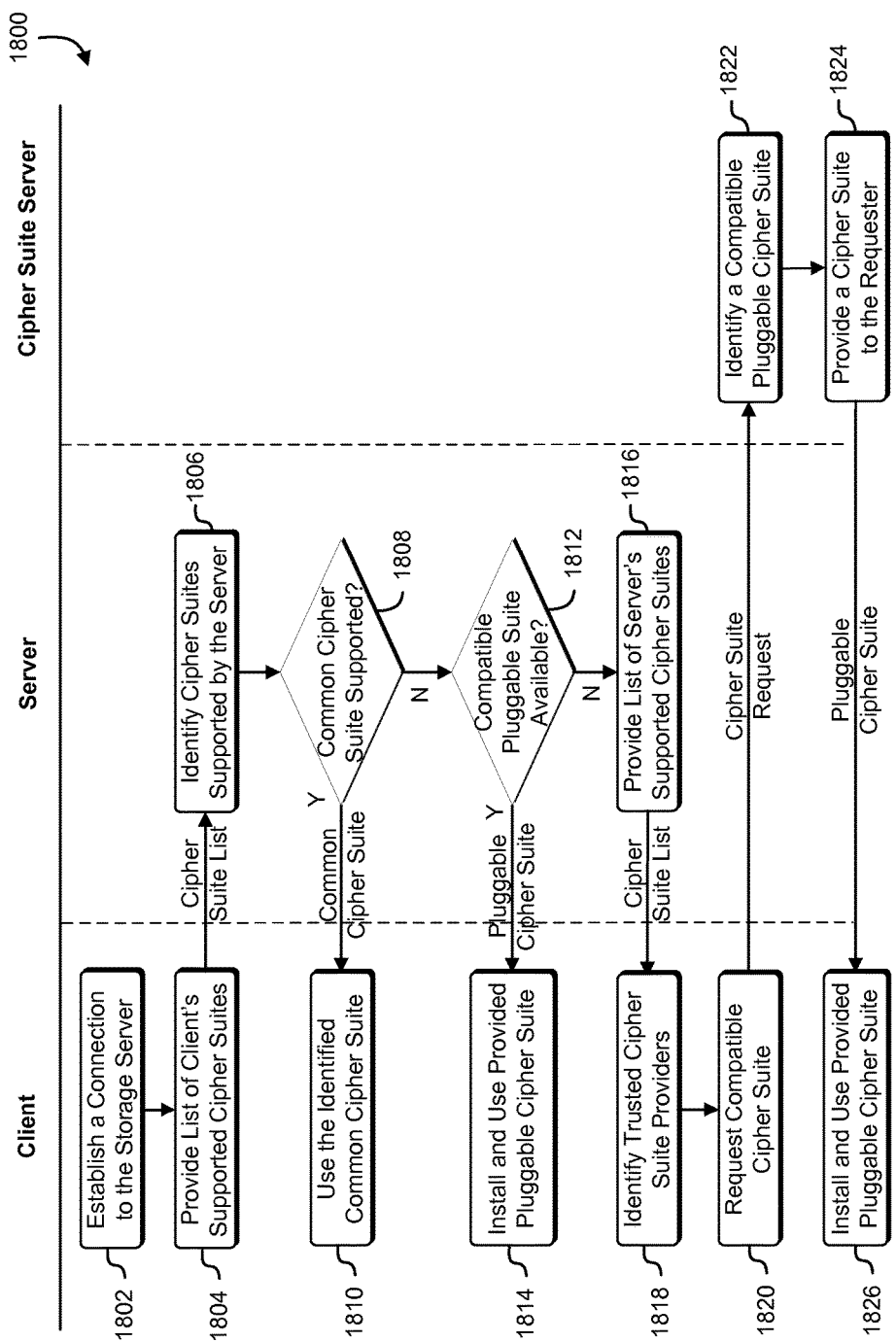
FIG. 18 shows an illustrative example of a process that, when performed, negotiates a cipher suite to be used between the client and a server.

FIG. 18 shows an illustrative example of a process that, when performed, negotiates a cipher suite to be used between the client and a server. A swim diagram 1800 shows a number of operations performed by a client, a server, and a cipher suite server. At block 1802, the client establishes a connection to a storage server. The client provides 1804 a list of the client's currently supported cipher suites, and a set of pluggable capabilities, to the server. In some embodiments, the list of currently supported cipher suites include pluggable cipher suites that have already been installed.

When the server receives a list of supported cipher suites, the server identifies 1806 a set of cipher suites that are supported by the server. At decision block 1808, the server determines whether there is a common cipher suite supported by both the server and the client. When more than one cipher suite is supported by both the client and server, a common cipher suite is selected based at least in part on cipher suite preferences. In one implementation, cipher suite preferences are based at least in part on the ordering of the list of supported cipher suites provided by the client. In another implementation, the server maintains a preference ordering of cipher suites. The common cipher suite is provided to the client and, at block 1810, the client uses the provided common cipher suite.

When there is not a common cipher suite supported by both the server and the client, execution proceeds to decision block 1812, and the server determines whether a compatible pluggable cipher suite is stored on the server. In certain embodiments, the client provides a list of pluggable capabilities along with the cipher suite list. The list of pluggable capabilities may include information that describes the client's runtime environment, sandbox environments, amount of available memory, amount of available storage space, operating system capabilities, and other information to determine whether a particular pluggable cipher suite is compatible with a pluggable cipher suite sandbox on the client. When the server is able to locate a cipher suite that is compatible with the client, and compatible with the client's current pluggable capabilities, the server provides the pluggable cipher suite to the client, and the client installs and uses 1814 the provided pluggable cipher suite.

In some implementations, a pluggable cipher suite is provided to a client even when there is a mutually-supported cipher suite. In some situations, when a client computer system reports a list of supportable cipher suites to a server computer system, the server computer system may determine that a pluggable cipher suite provides superior security or performance. For example, in some situations, the server computer system may determine that none of the cipher suites in the list of supported cipher suites provided by the client computer system provides an acceptable level of security. In another example, the server merges the list of supported cipher suites with a list of cipher suites supportable using pluggable cipher suites. Each cipher suite in the merged list of cipher suites is evaluated to determine the cipher suite that provides the best combination of security and performance.

When the server is not able to locate a pluggable cipher suite on the server that is compatible with the client, execution proceeds to block 1816, and the server provides a list of the server's supported cipher suites to the client. In some implementations, the server provides a list of alternative pluggable cipher suite providers. At block 1818, the client identifies an alternative pluggable cipher suite server. The client requests 1820, from the identified cipher suite server, a compatible pluggable cipher suite by providing the list of the server's supported cipher suites, and the client's current pluggable capabilities. The cipher suite server searches a library of pluggable cipher suites maintained by the cipher suite server, and identifies 1822 a compatible pluggable cipher suite. In some embodiments, the request sent to the cipher suite server includes a preference ordering of cipher suites. At block 1824, the cipher suite server provides the identified compatible pluggable cipher suite to the client. The client installs 1826 the provided compatible pluggable cipher suite into an executable sandbox, and communicates with the server using the cipher suite supported by the compatible pluggable cipher suite. In some embodiments, when pluggable cipher suites are installed on the client, they are maintained by the client, and added to the set of cipher suites supported for use when connecting to other clients and servers.

Figure 19:
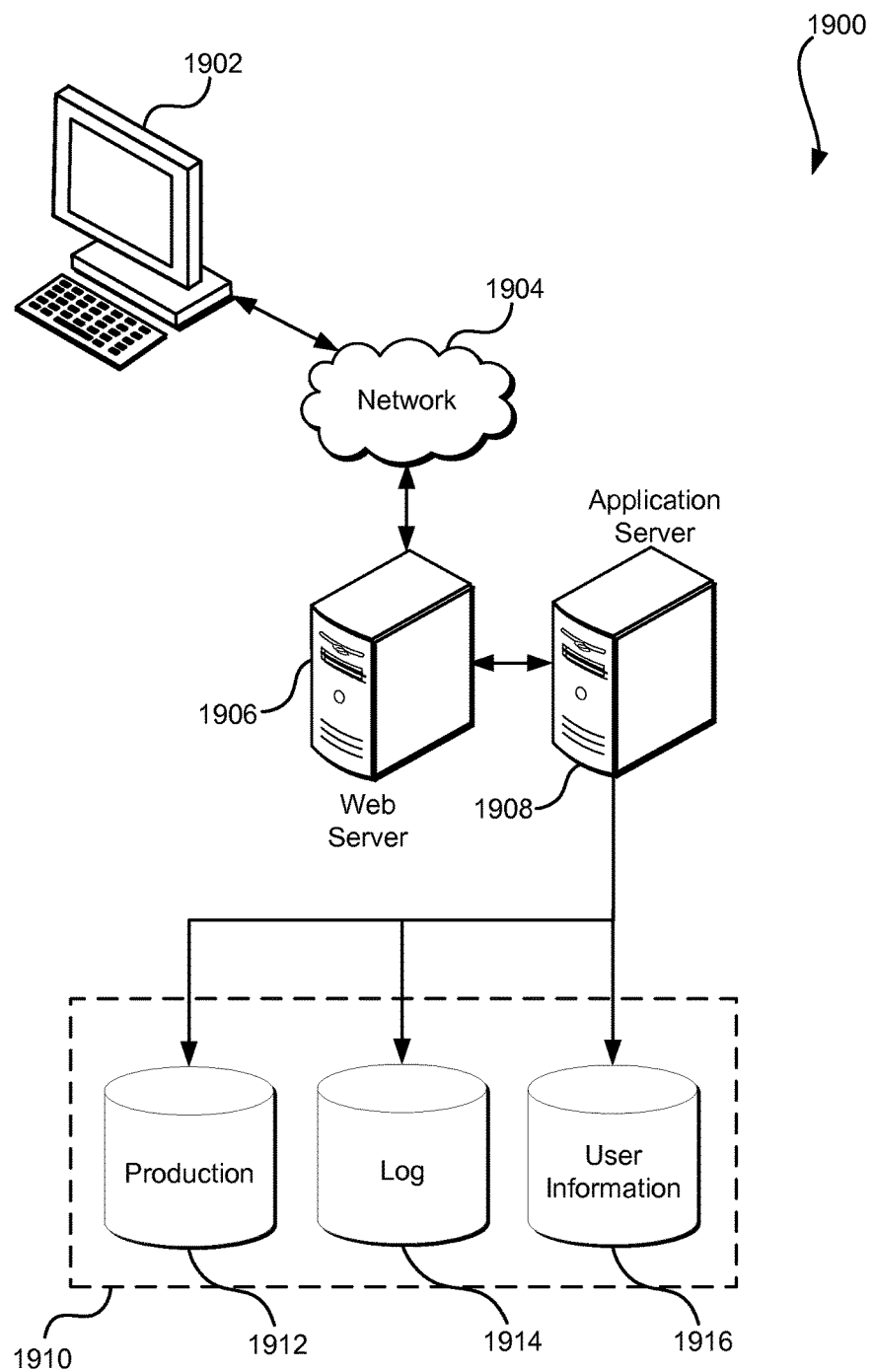
FIG. 19 illustrates an environment in which various embodiments can be implemented.

FIG. 19 illustrates aspects of an example environment 1900 for implementing aspects in accordance with various embodiments. As will be appreciated, although a web-based environment is used for purposes of explanation, different environments may be used, as appropriate, to implement various embodiments. The environment includes an electronic client device 1902, which can include any appropriate device operable to send and/or receive requests, messages, or information over an appropriate network 1904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1902 and the application server 1908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1910 can include several separate data tables, databases, data documents, dynamic data storage schemes and/or other data storage mechanisms and media for storing data relating to a particular aspect of the present disclosure. For example, the data store illustrated may include mechanisms for storing production data 1912 and user information 1916, which can be used to serve content for the production side. The data store also is shown to include a mechanism for storing log data 1914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update or otherwise process data in response thereto. The application server 1908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser.

It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Embodiments of the disclosure can be described in view of the following clauses:

1. A computer-implemented method, comprising:
under the control of one or more computer systems configured with executable instructions,
generating a data encryption key;
encrypting a message with the data encryption key;
encrypting the data encryption key with a key encrypting key;
storing the encrypted data encryption key to be accessible via a server;
as a result of storing the encrypted data encryption key, determining a data encryption key reference usable to retrieve the data encryption key from the server;
creating an envelope that includes the encrypted message and the data encryption key reference; and
transmitting the envelope to a recipient.

2. The computer-implemented method of clause 1, wherein:
the method further comprises encrypting the data encryption key reference with the key encrypting key; and
the data encryption key reference that is included in the envelope is encrypted with the key encrypting key.

3. The computer-implemented method of any of clauses 1 or 2, wherein the data encryption key reference is a pre-signed URI that includes security credentials which grant access to a data encryption key stored on the server for a limited amount of time.

4. The computer-implemented method of any of clauses 1 to 3, wherein generating a data encryption key is accomplished at least in part by receiving the data encryption key from the server.

5. The computer-implemented method of any of clauses 1 to 4, further comprising:
encrypting a second message with the data encryption key;
creating a second envelope that includes the encrypted second message and the data encryption key reference; and
transmitting the second envelope to the recipient.

6. A system, comprising at least one computing device configured to implement one or more services, wherein the one or more services are configured to:
receive an envelope from a client, the envelope including a data encryption key reference and data encrypted with a data encryption key;
provide the data encryption key reference to a server;
receive, from the server, an encrypted data encryption key that is associated with the data encryption key reference;
decrypt the encrypted data encryption key with a key encrypting key to produce the data encryption key; and
decrypt the data with the data encryption key.

7. The system of clause 6, wherein the one or more services are further configured to decrypt the data encryption key reference with the key encrypting key.

8. The system of any of clauses 6 or 7, wherein the one or more services are further configured to:
receive a second envelope from the client, the second envelope including a second data encryption key reference and a second data encrypted with the data encryption key;
determine that the second data encryption key reference references the data encryption key; and
decrypt the second data with the data encryption key.

9. The system of any of clauses 6 to 8, wherein the key encrypting key is a public key of a public-private key pair.

10. The system of any of clauses 6 to 9, wherein the one or more services is further configured to:
generate a response message;
determine a trust score for the client;
determine whether the trust score is greater than a threshold value;
as a result of determining that the trust score is greater than the threshold value, provide the response message to the client in unencrypted form; and
as a result of determining that the trust score is not greater than threshold value, provide the response message to the client in encrypted form.

11. The system of clause 10, wherein:
the one or more services receives credentials from the client; and
the trust score is determined based at least in part on the received credentials.

12. The system of any of clauses 10 or 11, wherein the trust score is based at least in part on a network address of the client and a set of trusted network addresses.

13. A non-transitory computer-readable storage medium having stored thereon executable instructions that, when executed by one or more processors of a computer system, cause the computer system to at least:
receive a request from a client, the request including a data encryption key reference and data encrypted with a data encryption key;
provide the data encryption key reference to a server;
receive, from the server, a data encryption key that is associated with the data encryption key reference; and
decrypt the data with the data encryption key.

14. The non-transitory computer-readable storage medium of clause 13, wherein the data encryption key reference is a pre-signed URI that expires after an amount of time.

15. The non-transitory computer-readable storage medium of any of clauses 13 or 14, wherein the data encryption key reference is an index to a key management system.

16. The non-transitory computer-readable storage medium of any of clauses 13 to 15, wherein the instructions further comprise instructions that, when executed by the one or more processors, cause the computer system to decrypt the data encryption key with a key encrypting key.

17. The non-transitory computer-readable storage medium of clause 16, wherein the key encrypting key is a shared-secret cryptographic key.

18. The non-transitory computer-readable storage medium of any of clauses 16 or 17, wherein the instructions further comprise instructions that, when executed by the one or more processors, cause the computer system to:
indicate, to the server, that the key encrypting key is potentially compromised; and
receive a new key encrypting key from the server.

19. The non-transitory computer-readable storage medium of any of clauses 13 to 16, wherein the instructions further comprise instructions that, when executed by the one or more processors, cause the computer system to:
generate a response message;
determine a trust score for the client;
determine whether the trust score is greater than a threshold value;
as a result of determining that the trust score is greater than the threshold value, provide the response message to the client in unencrypted form; and
as a result of determining that the trust score is not greater than threshold value, provide the response message to the client in encrypted form.

20. The non-transitory computer-readable storage medium of clause 19, wherein the response message is provided to the client in encrypted form at least in part by:
generating a response data encryption key;
encrypting the response message with the response data encryption key;
providing the response data encryption key to the server;
receiving a response data encryption key reference from the server; and
providing the response data encryption key reference and the encrypted response message to the client.

21. A computer-implemented method, comprising:
under the control of a server computer system configured with executable instructions,
as part of a negotiation of a cryptographically protected communications session with a client computer system, receiving information that specifies a list of client-supported cipher suites from the client computer system and a list of pluggable capabilities from the client computer system;

determining to provide a pluggable cipher suite to a client; and as a result of determining to provide a pluggable cipher suite to a client:

selecting, based at least in part on the list of pluggable capabilities, a pluggable cipher suite comprising executable code that, when executed by the client computer system, causes the client computer system to utilize a cipher suite that is supported by the server computer system; and providing a pluggable cipher suite to the client computer system.

22. The computer-implemented method of clause 21, wherein providing the pluggable cipher suite to the client computer system is performed by at least identifying a pluggable cipher suite that is compatible with the list of pluggable capabilities from a collection of pluggable cipher suites stored on the server computer system.

23. The computer-implemented method of any of clauses 21 or 22, wherein providing the pluggable cipher suite to the client computer system is performed by at least:

identifying another server that has access to a pluggable cipher suite that is compatible with the pluggable capabilities of the client computer system; and providing a reference to the other server to the client computer system.

24. The computer-implemented method of any of clauses 21 to 23, wherein receiving information that specifies a list of client-supported cipher suites from the client computer system and a list of pluggable capabilities from the client computer system is accomplished at least in part using a TLS handshake.

25. The computer-implemented method any of clauses 21 to 24, wherein determining to provide a pluggable cipher suite to a client is accomplished by determining that the server computer system fails to support at least one cipher suite from the list of client-supported cipher suites.

26. A system, comprising at least one computing device configured to implement one or more services, the one or more services configured to:

receive information specifying a set of cipher suites;

determine whether to specify a cipher suite of the set of cipher suites or provide a pluggable cipher suite; and as a result of determining to provide a pluggable cipher suite, identify a pluggable cipher suite that is compatible with a set of pluggable capabilities, and provide the pluggable cipher suite for a negotiation of a cryptographically protected communications session with a client.

27. The system of clause 26, wherein providing the pluggable cipher suite is accomplished at least in part by:

determining that there is not a compatible pluggable cipher suite stored on the system; and as a result of determining that there is not a compatible pluggable cipher suite stored on the system, providing a network address of a cipher-suite server that has the pluggable cipher suite.

28. The system of any of clauses 26 or 27, wherein identifying a pluggable cipher suite is accomplished at least in part by selecting the pluggable cipher suite from a plurality of pluggable cipher suites, based at least in part on a preference order of cipher suites maintained by the system.

29. The system of any of clauses 26 to 28, wherein the pluggable cipher suite is digitally signed with a cryptographic key associated with the system.

30. The system of any of clauses 26 to 29, wherein the system is further configured to provide a sandboxed execution environment compatible with the pluggable cipher suite.

31. The system of any of clauses 26 to 30, wherein the received information includes the set of pluggable capabilities.

32. The system of any of clauses 26 to 31, wherein the set of pluggable capabilities describes a type of executable program, a maximum program size, and an environment version identifier.

33. A non-transitory computer-readable storage medium having stored thereon executable instructions that, when executed by one or more processors of a computer system, cause the computer system to at least:

as part of a negotiation of a cryptographically protected communications session, provide, to a server device, a set of supported cipher suites;

receive, as a result of the negotiation, a pluggable cipher suite that is compatible with a set of pluggable capabilities; and use the pluggable cipher suite to communicate over the cryptographically protected communications session.

34. The non-transitory computer-readable storage medium of clause 33, wherein the instructions further comprise instructions that, when executed by the one or more processors, cause the computer system to:

receive, from the server device, a set of server-supported cipher suites;

provide, to another server, the set of server-supported cipher suites; and receive, from the other server, a pluggable cipher suite that is compatible with the set of pluggable capabilities, and that implements at least one cipher suite from the set of server-supported cipher suites.

35. The non-transitory computer-readable storage medium of any of clauses 33 or 34, wherein the instructions further comprise instructions that, when executed by the one or more processors, cause the computer system to verify an origin of the pluggable cipher suite at least by validating a digital signature of the pluggable cipher suite.

36. The non-transitory computer-readable storage medium of any of clauses 33 to 35, wherein the instructions that cause the computer system to execute the pluggable cipher suite further include instructions that cause the computer system to: identify a remote execution environment on a sandbox server, the remote execution environment being compatible with the pluggable cipher suite;

upload the pluggable cipher suite to the sandbox server; and cause the pluggable cipher suite to be executed on the remote execution environment.

37. The non-transitory computer-readable storage medium of any of clauses 33 to 36, wherein using the pluggable cipher suite to communicate over the cryptographically protected communications session is accomplished at least by executing the pluggable cipher suite in a sandboxed execution environment.

38. The non-transitory computer-readable storage medium of any of clauses 33 to 37, wherein as part of the negotiation of the cryptographically protected communications session, the set of pluggable capabilities is additionally provided to the server device.

39. The non-transitory computer-readable storage medium of any of clauses 33 to 38, wherein using the pluggable cipher suite to communicate over the cryptographically protected communications session is accomplished at least by executing the pluggable cipher suite on a virtual machine that isolates a runtime environment of the pluggable cipher suite from other processes on the computer system that execute the protected communications session.

40. The non-transitory computer-readable storage medium of any of clauses 33 to 39, wherein the pluggable cipher suite is a JavaScript program.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   as part of a negotiation of a cryptographically protected communications session with a client computer system, receiving information to a server computer system that specifies a list of client-supported cipher suites from the client computer system and a list of pluggable capabilities from the client computer system;
   determining, based at least in part on the negotiation of the cryptographically protected communications session, to provide a pluggable cipher suite to the client computer system;
   identifying the pluggable cipher suite to the client computer system;
   causing the client computer system to acquire, from a cipher suite server, executable code that, as a result of being executed by the client computer system, causes the client computer system to utilize the pluggable cipher suite that is supported by the server computer system; and
   establishing the cryptographically protected communications session with the client computer system using the pluggable cipher suite.

2. The computer-implemented method of claim 1, wherein establishing the cryptographically protected communications session with the client computer system using the pluggable cipher suite is performed by at least identifying a pluggable cipher suite that is compatible with the list of pluggable capabilities from a collection of pluggable cipher suites stored on the server computer system.

3. The computer-implemented method of claim 1, wherein establishing the cryptographically protected communications session with the client computer system using the pluggable cipher suite is performed by at least:

identifying an additional server computer system that has access to a pluggable cipher suite that is compatible with the list of pluggable capabilities of the client computer system; and providing a reference to the additional server computer system to the client computer system.

4. The computer-implemented method of claim 1, wherein receiving information to a server computer system that specifies a list of client-supported cipher suites from the client computer system and a list of pluggable capabilities from the client computer system is accomplished at least in part using a TLS handshake.

5. The computer-implemented method of claim 1, wherein determining to provide a pluggable cipher suite to the client computer system is accomplished by determining that the server computer system fails to support at least one cipher suite from the list of client-supported cipher suites.

6. A system, comprising:
one or more processors; and
a memory storing executable instructions that, as a result of being executed on the one or more processors, cause the system to:
receive information specifying a set of cipher suites supported by a client computer system;
determine to provide a pluggable cipher suite that is not in the set of cipher suites;
as a result of determining to provide the pluggable cipher suite, cause the client computer system to acquire, from a cipher suite server, executable code that, as a result of being executed by the client computer system, causes the client computer system to utilize the pluggable cipher suite; and
establish a cryptographically protected communications session with the client computer system using the pluggable cipher suite.

7. The system of claim 6, wherein providing the pluggable cipher suite is accomplished at least in part by:
determining that there is not a compatible pluggable cipher suite stored on the system; and
as a result of determining that there is not a compatible pluggable cipher suite stored on the system, providing a network address of a cipher-suite server that has the pluggable cipher suite.

8. The system of claim 6, wherein establishing the cryptographically protected communications session with the client computer system using the pluggable cipher suite is accomplished at least in part by selecting the pluggable cipher suite from a plurality of pluggable cipher suites, based at least in part on a preference order of cipher suites maintained by the system.

9. The system of claim 6, wherein the pluggable cipher suite is digitally signed with a cryptographic key associated with the system.

10. The system of claim 6, wherein the system is further configured to provide a sandboxed execution environment compatible with the pluggable cipher suite.

11. The system of claim 6, wherein:
the executable instructions further causes the system to receive a set of pluggable capabilities from the client computer system; and
the set of pluggable capabilities describe a type of executable program, a maximum program size, and an environment version identifier.

12. The system of claim 6, wherein the cipher suite server is a computer server that is separate from the system.

13. A non-transitory computer-readable storage medium having stored thereon executable instructions that, as a result of being executed by one or more processors of a computer system, cause the computer system to at least:
as part of a negotiation of a cryptographically protected communications session, provide, to a server device, a set of supported cipher suites;
receive, as a result of the negotiation, information that identifies a pluggable cipher suite that is compatible with a set of pluggable capabilities;
acquire, from a cipher suite server, executable code that, as a result of being executed by the computer system, allows the computer system to use the pluggable cipher suite; and
use the pluggable cipher suite to communicate over the cryptographically protected communications session with the server device.

14. The non-transitory computer-readable storage medium of claim 13, wherein the executable instructions further comprise instructions that, as a result of being executed by the one or more processors, cause the computer system to:
receive, from the server device, a set of server-supported cipher suites;
provide, to an additional server, the set of server-supported cipher suites; and
receive, from the additional server, a pluggable cipher suite that is compatible with the set of pluggable capabilities, and that implements at least one cipher suite from the set of server-supported cipher suites.

15. The non-transitory computer-readable storage medium of claim 13, wherein the executable instructions further comprise instructions that, if executed by the one or more processors, cause the computer system to verify an origin of the pluggable cipher suite at least by validating a digital signature of the pluggable cipher suite.

16. The non-transitory computer-readable storage medium of claim 13, wherein the executable instructions that cause the computer system to execute the pluggable cipher suite further include instructions that cause the computer system to:
identify a remote execution environment on a sandbox server, the remote execution environment being compatible with the pluggable cipher suite;
upload the pluggable cipher suite to the sandbox server; and
cause the pluggable cipher suite to be executed on the remote execution environment.

17. The non-transitory computer-readable storage medium of claim 13, wherein using the pluggable cipher suite to communicate over the cryptographically protected communications session is accomplished at least by executing the pluggable cipher suite in a sandboxed execution environment.

18. The non-transitory computer-readable storage medium of claim 13, wherein as part of the negotiation of the cryptographically protected communications session, the set of pluggable capabilities is additionally provided to the server device.

19. The non-transitory computer-readable storage medium of claim 13, wherein using the pluggable cipher suite to communicate over the cryptographically protected communications session is accomplished at least by executing the pluggable cipher suite on a virtual machine that isolates a runtime environment of the pluggable cipher suite from other processes on the computer system that execute the protected communications session.

20. The non-transitory computer-readable storage medium of claim 13, wherein the pluggable cipher suite is a JavaScript program.

\* \* \* \* \*